United States Patent
Underkoffler et al.

[15] 3,699,318
[45] Oct. 17, 1972

[54] INCREMENTAL SLOPE METHOD FOR OPTIMUM CONTINUOUS DIGITAL LINEARIZATION

[72] Inventors: Victor S. Underkoffler, Doylestown; Richard B. White, Lansdale, both of Pa.

[73] Assignee: Leeds & Northrup Company, Philadelphia, Pa.

[22] Filed: Aug. 19, 1970

[21] Appl. No.: 64,977

[52] U.S. Cl.................235/151.1, 444/1, 340/347 AD
[51] Int. Cl..................................................G06f 9/00
[58] Field of Search........324/132, 77 A; 235/150.53; 328/143; 444/1, 843

[56] References Cited

UNITED STATES PATENTS 3,513,301  5/1970  Howe....................235/150.53
3,557,347  1/1971  Robertson............235/150.53

OTHER PUBLICATIONS

" On the Approximation of Curves by Line Segments Using Dynamic Programming" by Bellman, Communications of the ACM, Vol. 4, p. 284 June 1961.
" Remarks on the Application of Dynamic Programming to Function Generation" by Gracon & Strauss Simulation, November 1968.

Primary Examiner—Eugene G. Botz
Attorney—Woodcock, Washburn, Kurtz & Mackiewicz

[57] ABSTRACT

An incremental slope method for optimum continuous digital linearization is performed utilizing a programmed digital computer to determine the straight line segments best approximating a nonlinear function. By incrementing the slope of a straight line segment at each breakpoint on or near the curve of the nonlinear function, the difference between the value of the dependent variable on the function and the value of the dependent variable on the straight line segment for different slopes may be determined. By minimizing this difference and maximizing straight line segment length, the best approximating straight line segment is determined. In this manner, a linearized approximating function may be obtained for any set of data points stored in the computer corresponding to any nonlinear function such as a thermocouple curve. The straight line approximating segments with their corresponding preset values of slope and intercept are then utilized to linearize an analog-to-digital converter.

18 Claims, 13 Drawing Figures

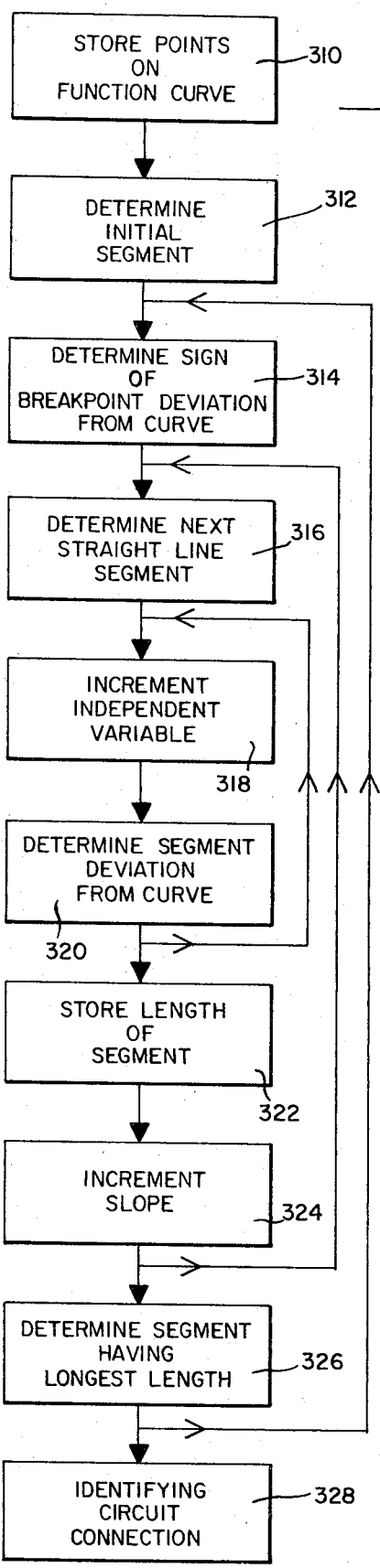
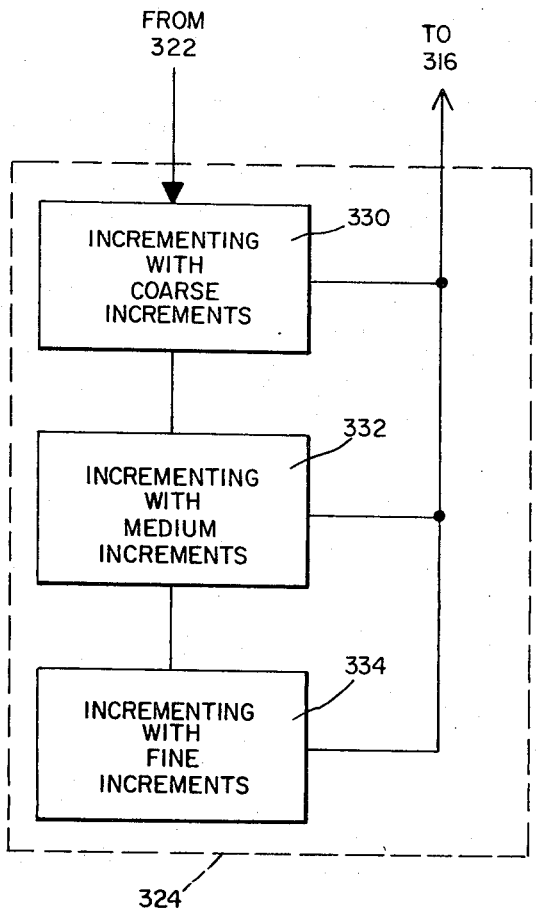
Fig. 4
Fig. 5

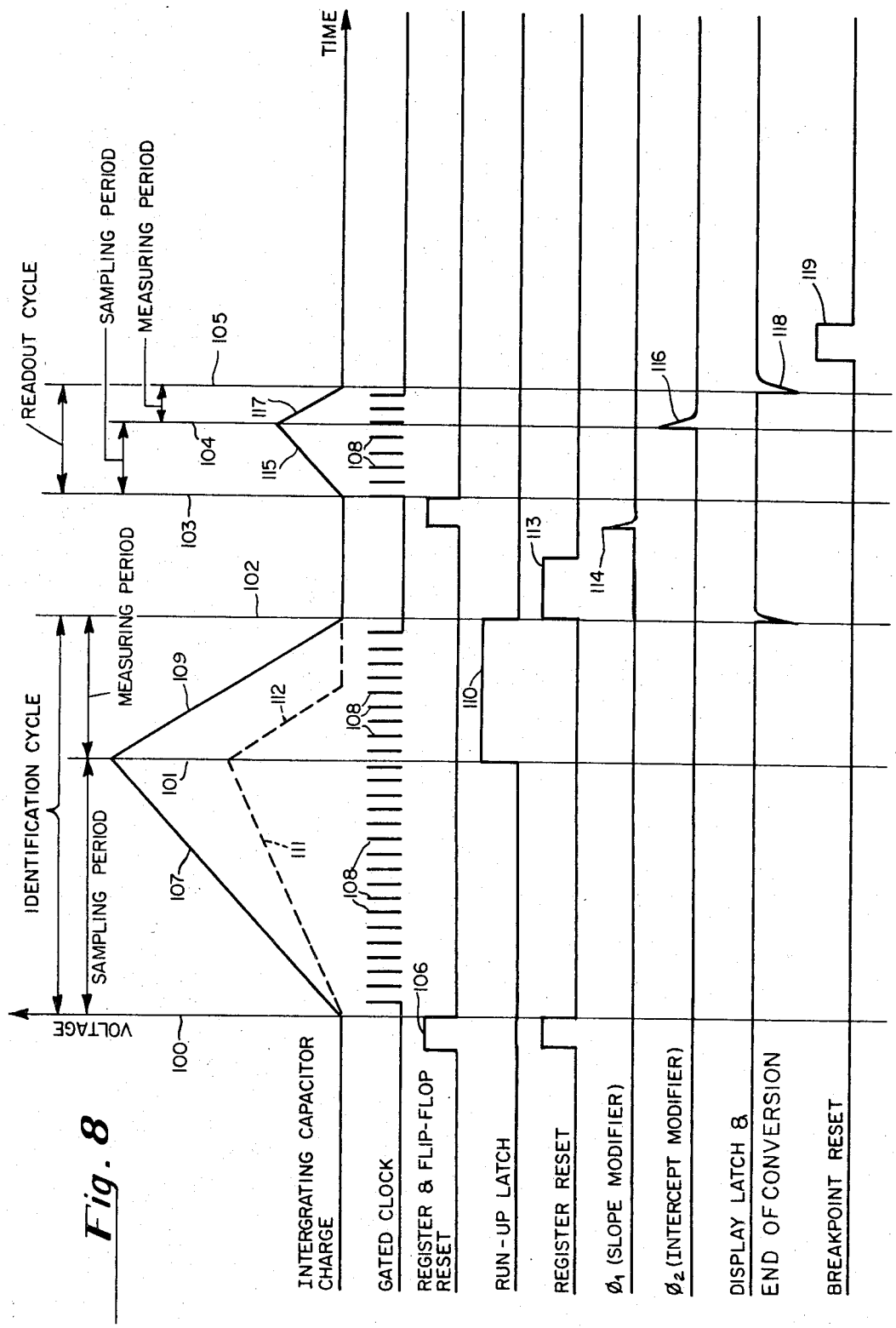

INCREMENTAL SLOPE METHOD FOR OPTIMUM CONTINUOUS DIGITAL LINEARIZATION

BACKGROUND OF THE INVENTION

1. Field of the Invention

This invention relates to the conversion of an independent variable input signal to a dependent variable output signal which is a nonlinear function of the input signal.

More particularly, this invention relates to a method for approximating the nonlinear function by a plurality of straight line segments.

The output of various sensors (voltage, current, resistance, etc.,) is, in general, a nonlinear function of the variable being measured (temperature, pressure, displacement, etc.). It is often desirable to obtain a direct reading in engineering units of the variable being measured from a signal obtained at the output of the various sensors. Various systems have been devised for obtaining such a reading. One such system is sold by Leeds & Northrup Company under the trademark NUMATRON which provides, within the digital mode, linearization of these nonlinear sensor outputs by dynamically presetting both the sample period and the measuring period of a dual slope integrating digital voltmeter to predetermined values for each straight line approximating segment for the sensor curve. The method by which the straight line approximating segments are predetermined is of crucial importance for realizing the full efficiency of a system such as the NUMATRON and forms the basis of this invention.

2. The Prior Art

Perhaps the most popular of prior art mathematical techniques for linearization is the Straight Line Approximating Method with Breakpoints on the Curve. The technique, utilizing a high speed digital computer, initiates at a first data point on the curve and extends straight line segments from this first or initial point through a second data point, a third, a fourth, etc. With each straight line approximation, the slope and intercept of the segment are calculated. Using the slope and intercept as calculated constants, at each value of the independent variable, the straight line approximating value of the dependent variable may be calculated. The straight line approximating value of the dependent variable is then subtracted from the true value of the dependent variable to yield the approximating error. The straight line approximating error at each value of the independent variable is then compared to a predetermined error or deviation limit. If the absolute value of the error at any value of the independent variable is less than the limit, a new straight line approximating segment is extended from the same initial point to a new final point which represents an increment along the curve. The calculation routine is now initiated for this new straight line approximating segment. That is all of the approximating error values on the new segment are determined and compared to the limit. The loop continues until any one of the absolute values of the approximating error in an interval is equal to or greater than the preselected initiating error limit. When this occurs, the loop is terminated and the segment is defined as a line between the initial point and the next to the last incremented point on the curve. The remaining approximating segments of the curve are calculated in the same manner initiating at the last point on the previous segment.

The straight line approximating method with the breakpoints on the curve is, in general, a fairly reliable method for linearization. Its greatest advantage is that each approximated segment is joined to the previous segment at the breakpoint. That is to say, the successive straight line approximations to the curve are completely continuous throughout the range of approximation. The greatest disadvantage being that the breakpoints must be on the curve as dictated by the method. This does not provide for optimum linearization as will be described later.

The best prior art way to approximate a set of discrete data points for the straight line is the classical method of Least Squares. The Least Squares method minimizes the sum of the squares of the differences from the true value to the approximating value. Adapting the Least Squares method to linearization of nonlinear sensor outputs, the technique includes the greatest possible number of data points (hence the longest segment) in a Least Squares straight line approximation within the limit of a preselected approximating error.

The greatest advantage of a successive Least Squares method of approximation is it provides for an optimum linearization. That is, for a given range and limit of error, the method fits the curve with the fewest number of segments. The greater disadvantage being that the method is inherently discontinuous at the breakpoints. Actually each segment is independent of the previous one. Depending on the nature of the error values at the breakpoint for adjacent segments, with the "jump discontinuities" that exist, it is possible to obtain the same approximating value for the dependent variables for discretely different independent variables on either side and close to the breakpoint. The opposite, and perhaps more serious case is also true. It is possible that no unique value of the independent variable will be obtained because of the "jump discontinuity" at the breakpoint. Essentially, a hole exists in the function near the breakpoint. This is particularly critical in a system such as the NUMATRON which is intended to display a dependent variable as a nonlinear function of an independent variable in the form of a nonlinear sensor output.

A dynamic programming approach attempting to minimize the maximum allowable difference between a nonlinear function and a straight line approximating segment at any given individual data point in that segment is disclosed in "Remarks on the Application of Dynamic Programming to Function Generation," Gracon, T. J., and Stauss, J. C., *Simulation*, Nov., 1968. This dynamic programming approach does not attempt to minimize the maximum allowable difference between the actual function and the straight line approximating segment at any given individual data point in that segment. The maximum difference between the actual function and the straight line approximation at a given data point could be different for each straight line approximating segment. Furthermore, this dynamic programming approach results in a discontinuous approximation which may be undesirable for the previously described reasons. Also, this dynamic programming approach appears to limit the minimum spacing between the break points.

In "Automatic Techniques for Economic Computer Computation of Continuous Functions," Isadore L.

Goldhirsh, *Simulation*, July, 1968, various methods for constructing linear string approximation to single valued continuous functions are compared. When compared, the author indicates that the Secant method where breakpoints lie off the curve and where the error between the approximating segment and function changes in sign is preferred. However, the Secant method as described suffers from discontinuities in the approximating line segments.

A Secant approximation of a function is disclosed in U.S. Pat. No. 2,975,369 — Vance. However, there is no method disclosed for achieving the optimum in a Secant approximation of a nonlinear function.

SUMMARY OF THE INVENTION

In accordance with one aspect of the invention, a method is provided for obtaining an optimum, continuous straight line segment approximation of a nonlinear function.

The method involves determining the difference between the value of one variable of the function and the approximated value of the one variable on a straight line segment for various increments of the other variable and various increments of slope for the straight line segment. The longest straight line segment which yields a difference within a predetermined range of deviation or error limit is then determined. The end of the straight line segment defines the next breakpoint on the function and the foregoing steps are repeated to determined the next approximating straight line segment.

In accordance with another aspect of the invention, the foregoing method is performed on a computing apparatus, each step of the method being executed by the program of the computing apparatus. The various values of the variables for the nonlinear function may be stored in the computing apparatus before the straight line segments are determined.

In accordance with another aspect of the invention, the determined straight line segments are utilized to identify appropriate circuit connections in a system for converting a sensor or transducer output signal to a linearized digital output. By utilizing the breakpoints, slopes and intercepts corresponding to the approximating straight line segments, appropriate electrical connections may be plotted or wired in response to the determined approximating linear segments.

BRIEF DESCRIPTION OF THE DRAWINGS

For a more complete understanding of the invention and further objects and advantages thereof, reference is made to the following description taken in conjunction with the accompanying drawings in which:

FIG. 4 is a flow chart of one embodiment of the invention;

FIG. 5 is a flow chart of one block in the flow chart of FIG. 4;

FIG. 8 is a timing diagram useful in explaining the operation of the block diagram of FIG. 6 and the circuit diagrams of FIGS. 7a and 7b;

DETAILED DESCRIPTION OF THE INVENTION

For ease in understanding the present invention, the method will first be described in terms of a specific application to a thermocouple as an exemplary type of transducer characterized by a nonlinear function. Accordingly, reference is now made to FIG. 1 wherein a nonlinear temperature-voltage function characteristic of a thermocouple is disclosed in conjunction with a system for displaying a measured variable temperature.

Figure 1:
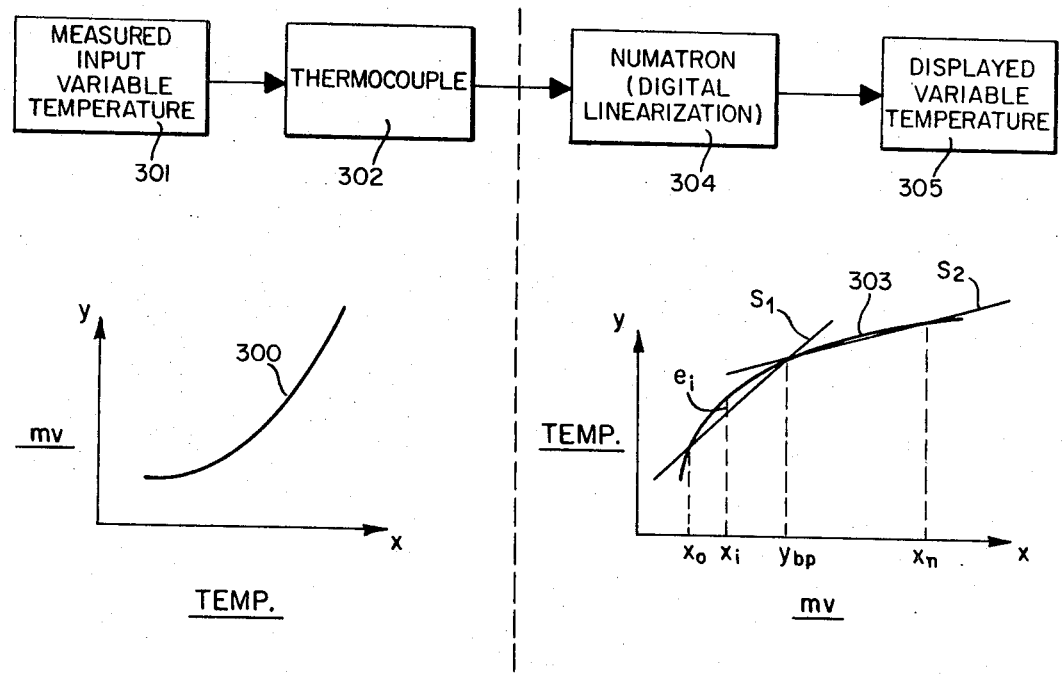
FIG. 1 is a schematic illustration of a system for obtaining a digital output as a nonlinear function of a sensor output signal and the nonlinear function associated therewith.

In FIG. 1, a curve 300 represents the conventional thermocouple temperature-voltage function with the measured variable temperature 301 at the input of a sensor or thermocouple transducer 302, plotted as the independent variable on a linear scale and the thermocouple transducer output voltage plotted as the dependent variable on a linear scale in terms of millivolts. As may be readily seen, the temperature-voltage function of the thermocouple is indeed nonlinear.

The same nonlinear relationship between temperature and voltage may be seen in a voltage-temperature curve 303 of FIG. 1 which may be thought of as the characteristic of a system 304 where the thermocouple output voltage is plotted as the independent variable system input on a linear abscissa scale and the temperature, which produces the thermocouple output voltage, is plotted as the dependent variable system output on a linear ordinate scale. Thus by coupling the thermocouple output voltage to the system 304 to be described hereinafter as the input to that system, a digital output may be obtained by the system 304 which is displayed as the temperature variable 305.

Digital linearization, in general, is concerned with the variables and parameters as outlined in the right hand portion of FIG. 1 with a thermocouple sensor serving as an example. The left hand portion of FIG. 1 relates to the input to the system 304.

Basically, the system 304 which may comprise a NUMATRON numeric display system manufactured by Leeds and Northrup Company accepts the sensor analog output signal as the independent variable, performs the analog to digital conversion, performs linearization completely within the digital mode, then produces the dependent variable in displayed engineering units. The system 304 is primarily concerned with three basic parameters shown in FIG. 1: (1) the number of straight line approximating segments ($S_p$, ($p = 1, 2, \ldots K$)), (2) the range of the function which is to be approximated $(x_n - x_o)$ and (3) the maximum allowable approximating error ($E$) for an error or deviation $e_i$ at different values of $x_i$ ($x_i = 1, 2, \ldots n$).

The first and foremost boundry condition of the system is the number of approximating segments. How the limited number of segments are used and where the breakpoints are placed (henceforth understood to mean the transition point $x_i$ from one straight line approximating segment to another as $x_i$ increases or decreases in value) is, as stated earlier, crucial to realizing full efficiency of the system. In general, however, using any of the common mathematical linearization techniques it can be understood, with the number of segments fixed at the maximum allowable dependent on the digital logic design of the system 304 that the range of approximation and the approximating error are interdependent. That is to say, by independently increasing (or decreasing) the range of the function to be approximated $(x_n - x_o)$ the absolute deviation or error limit $E$ of the approximation increases (or decreases) given the boundry condition that the number of segments allowable is a predetermined integer. The inverse of the previous statement, with the absolute approximating error limit increasing (or decreasing) independently, is also true.

In the discussion to follow, the term "curve" is understood to mean a discrete set of data points ($x_i, y_i$, ($i = 0, 1, 2, \ldots n$)) where the number of data points is very much greater than the number of straight line approximating segments, as is the case with thermocouple calibration tables. Or, as in the case of Spectray and Rayotube pyrometer, the term "curve" is defined by an analytic expression, $y = f(x)$ which is used to generate the discrete set of points to be linearized. For this example, the curve is understood to be monotonic over the range of approximation.

Figure 2:
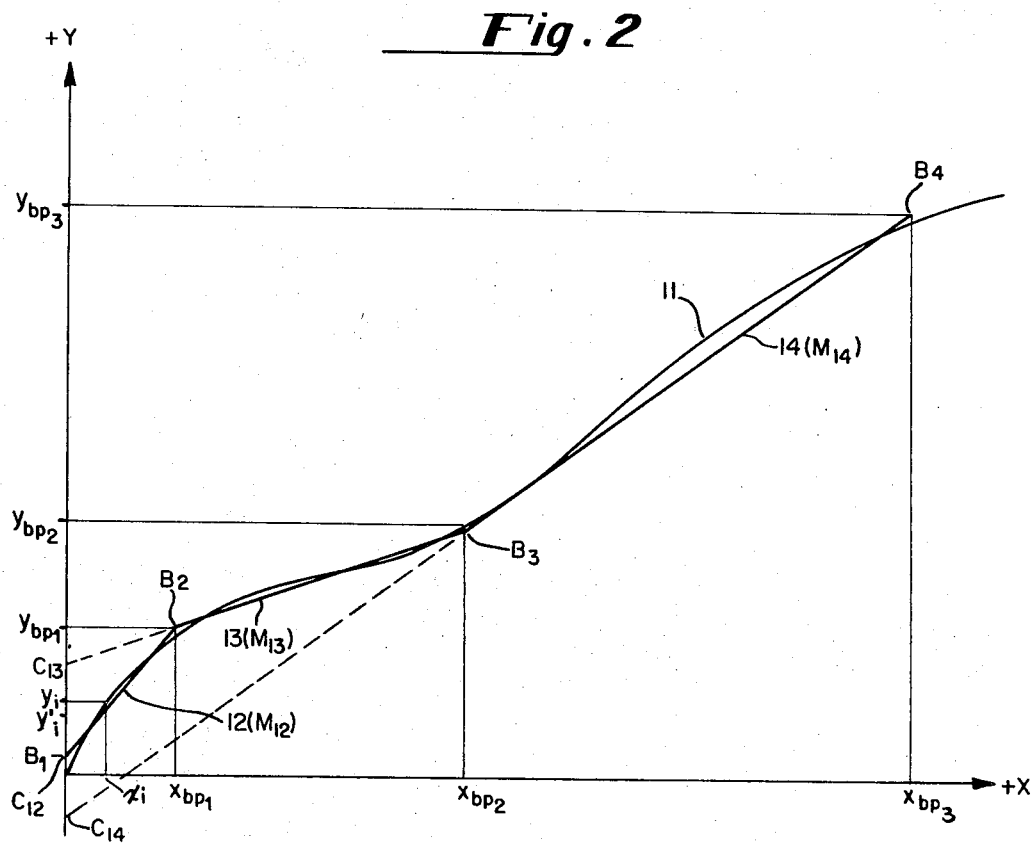
FIG. 2 is a graphical illustration of a nonlinear function approximated by a plurality of linear segments obtained by the method of this invention.

Referring to FIG. 2, the incremental slope method of this invention optimizes fit and continuity of the approximating straight line segments over the approximating range. The breakpoints $B_1$, $B_2$, $B_3$, and $B_4$ are not restricted to the curve 11 while at the same time continuity is maintained through the approximating segments 12, 13, and 14 characterized by slopes $M_{12}$, $M_{13}$, and $M_{14}$ and intercepts $C_{12}$, $C_{13}$, and $C_{14}$. That is, the endpoint of the previous segment is the first point of the next segment. Initiation of the incremental slope method is completely dependent on the previous calculated segment. The incremented slope theorem reads as follows:

For a monotonic curve, if the approximation to the curve as calculated from the previous straight line approximating segment at its breakpoint is greater than the true value at that breakpoint, then the value of the slope of the next segment must be less than the previous or the approximation will diverge from the curve.

Conversely, if the approximation to the curve as calculated from the previous straight line approximating segment at its breakpoint is less than the true value at that breakpoint, then the value of the slope of the next segment must be greater than the previous or the approximation will diverge from the curve.

Summarizing the theorem mathematically:

$x_{bp_k}$ = independent variable at the breakpoint ($k = 1, 2, \ldots$)

$y_{bp_k}$ = true dependent variable at $x_{bp_k}$
$y'_{bp_k}$ = straight line approximating value at $x_{bp_k}$
$e_{bp_k}$ = approximating error at $x_{bp_k}$
$M_k$ = value of slope for segment $S_k$
If: $= y'_{bp_k} > y_{bp_k}$ ($e_{bp_k}$ = positive)
Then: $M_{k+1} < M_k$
Conversely:
If: $y'_{bp_k} < y_{bp_k}$ ($e_{bp_k}$ = negative)
Then: $M_{r+1} > M_r$ The incremental slope method as performed by a programmed digital computer will now be described with reference to FIG. 2 and the flow diagram of FIG. 4. Initially, the points on the curve 11 are stored in the computer as indicated at a block 310. As mentioned earlier, the incremental slope method is completely dependent on the previous segment. Although you can initiate the method by fixing a dummy segment as well be explained later, you can also determine the initial segment 12 using a Least Squares fit method described in the prior art section as indicated by a block 312.

The error at the breakpoint $B_2$ is now checked for sign as indicated at a block 314. If the error $e_{bp_1}$ is positive (or negative), then the value of the slope of the segment 13 starting at $B_2$ which must be decreased (or increased) with respect to the slope $M_{12}$ of the segment 12.

Initially, the equation for a straight line segment terminating at breakpoint $B_2$ and extending upwardly along the curve is determined as indicated at a block 316. The error or deviation $e_i$ as shown in FIG. 1 is now determined for various values of $x_i$ along the curve 11 and the determined straight line segment. This is accomplished in a loop including blocks 318 and 320 which increments and extends the determined segment by one data point (incrementing $x_i$ by +1) until the absolute error of approximation becomes equal to or greater than the predetermined range of deviation designated as the limit error E. When the error $e_i$ exceeds the value of the error limit E, the error analysis loop including the blocks 318 and 320 terminates, steps back one data point (incrementing $x_i$ by −1), a counter records or stores the number of data points ($x_i, y_i$) included in the approximating segment (hence the length of the segment for that particular incremented slope) within the error limit E as indicated at a block 322.

The slope of the determined segment terminating at the breakpoint $B_2$ and extending upwardly along the curve 11 is now incremented from $B_2$ as indicated at a block 324. By providing a slope incrementing loop including blocks 316-324, another straight line segment is determined including the determination of the intercept at block 316. Once again, the inner error analysis loop is repeated looking for all absolute $e_i$ values on the newest incremented straight line approximation until the error limit E is reached as $x_i$ increases. Also, a counter again records the maximum length of the new approximating segment within the error limit E. The slope incrementing loop continues incrementing the previous slope to determined the segment 13 and re-initiating the error analysis loop until the length of the approximating segment as recorded by the counter is less than the previous straight line approximation provided by the previous increment in slope. Here the slope incrementing loop terminates since the longest straight line approximation within the preselected initiating limit error E has been passed. At this time, the segment 13 has been determined at a block 326 as having the longest length of all of those segments in a set starting at $B_2$ and terminating at the breakpoint $B_3$ staying within the limit of error E.

By providing an additional loop for determining the next segment 14, the entire curve 11 may be approximated by the straight line segments 12, 13, and 14. Using the characteristic slopes M and intercepts C of the segments 12, 13, and 14, appropriate circuit connections for the system 304 as shown in FIG. 1 and to be described in detail subsequently are identified. The circuit connections enable the system 304 to provide the digital linearization previously discussed. This step of identification is indicated at a block 328.

In the foregoing, a great deal of emphasis has been placed on the sign of the error at the breakpoints B and the direction of slope increment for the next line segment through that breakpoint. It becomes clear, in order to achieve a high degree of sensitivity, the value of the increment for the slope must be small so that the optimum fit (longest possible line segment) will be found. It is also clear, incrementing the slope in very small bits and running through the error analysis loop for each newly incremented slope in search of the optimum approximating segment would take a considerable amount of time even on a high-speed digital computer. Therefore, a system has been devised to implement the value of slope increment which will now be discussed with reference to FIG. 3 and the block diagram of FIG. 4.

The slope increments are taken in three steps, coarse, medium and fine in degree. The first slope increments (coarse increments) are 1 percent, for example, of the value of the slope of the previous segment corresponding to a block 330 in FIG. 5. Using 1 percent of the previous slope's value for the coarse increments moves the approximating segment to close proximity with the curve quickly regardless of the actual value of the slope of the previous segment. From FIG. 3, it is seen that coarse increment 5 has produced a shorter approximating segment than coarse increment 4 within the limit E. It is also obvious that with the best coarse increment 4, the optimum length approximating segment may have been passed over or not quite reached in the coarse incrementation of slope. However, it is certain that the slope of the optimum approximating segment lies somewhere about the slope yielded by coarse increment 4, that is, somewhere between the slope yielded by coarse increments 3 and 5.

Now, the slope of the best coarse approximating segment (increment 4) is incremented by medium steps as indicated in a block 332 of FIG. 5 which are 0.1 percent or 0.1 of the coarse increment size. The medium increments are made first in the negative direction from the best coarse approximation (medium increment A') and then in the positive direction from the best coarse approximation (medium increments A,B,C,C. The medium incremented slopes continue in each direction from the best coarse approximation until the length of a medium incremented approximating segment decreases from that of the previous segment within the limit E. That is, on the negative side medium incremented segment A' is less than coarse incremented segment 4 so no further medium steps are taken in that direction and the calculation returns to the values yielded by coarse increment 4. On the positive side medium increment D is less than C so the calculation returns to the values yielded by medium increment C. The slope of the optimum length approximating segment has been confined to values around two medium incremented slopes. That is, in the range from coarse increment 4 to medium increment A' on the negative side or between medium increments B and D on the positive side.

Figure 3:
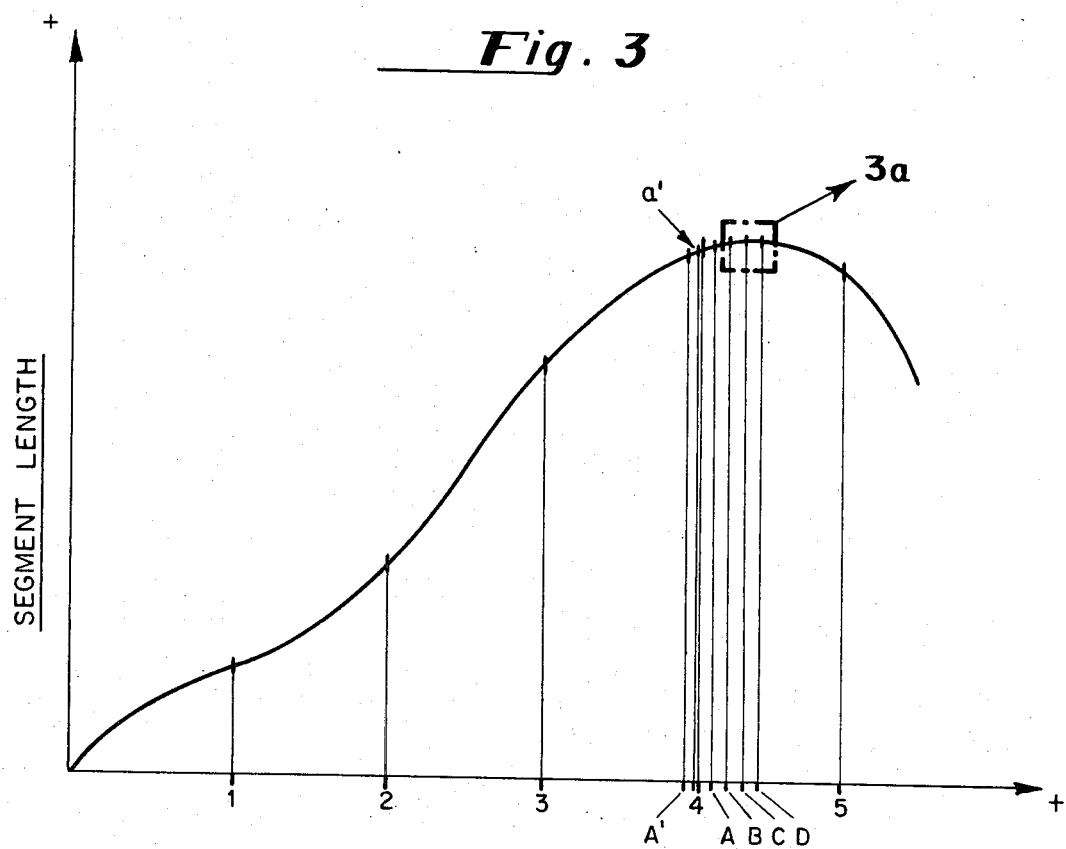
FIG. 3 is a graphical illustration of one phase in the method of this invention.
Figure 3A:
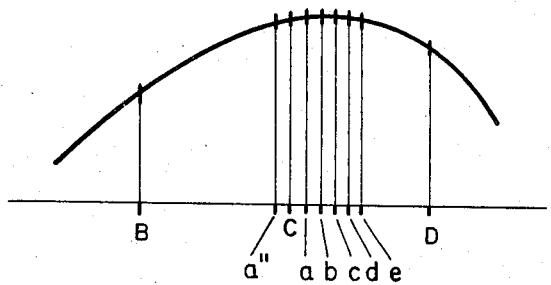
FIG. 3a illustrates in further detail the aspect illustrated in FIG. 3.

The search is now continued with fine increments within both these ranges as indicated by block 334 of FIG. 5. The value of fine increment is 0.1 that of the medium increment (0.01 of the coarse increment, or 0.01 percent of the slope of the preceding segment). The first fine increment is a' on the negative side of the coarse increment 4. Since the finely incremented approximation segment yielded by slope increment a' is shorter than the segment with slope yielded by coarse increment 4, the calculation again returns to the values yielded by coarse increment 4. In all cases, when fine increments are made from a coarse increment with no intermediate medium increment, the search is made in only one direction (i.e., in the direction in which there are no medium increments) because in the opposite direction from the coarse increment, the search has already been made with medium increments (A,B,C and D from coarse increment 4 for example). The fine increment search is now made on the positive side of coarse increment 4 as shown in FIG. 3a about the best medium increment segment C, first on the negative side of C with fine increment a" whose approximating segment is shorter than that yielded by medium increment C, so the calculation returns to the latter. The positive side of medium-incremented segment C is now searched with fine segments a,b,c,d and e. Since the approximating segment yielded by fine increment e is shorter than that yielded by fine increment d, the calculations are terminated with the longest possible straight line approximation yielded by fine-incremented slope d.

The search is now complete on both the negative and positive sides of the approximating segment yielded by the coarse increment 4. No better straight line approximating segments have been found on the negative side of 4 so the approximating segment with the slope yielded by coarse increment 4 is the best value found by the negative side search. However, on the positive side search with medium and fine incremented slopes, the best value is that yielded by fine increment d. Now, the best approximation found in the negative side search is compared to the best approximation found in the positive side search using the segment length criterion. It is now clear that the longest possible approximating segment within the error limit E is that yielded by finely incremented slope d, which is truly the optimum length approximating segment through the end point of the previous segment $(x_{bp_k}, y'_{bp_k})$ All other incremented slopes have been eliminated as something less than the optimum approximating segment as now defined by the breakpoint, intercept and the slope yielded by fine increment d.

Although the discussion of slope increments has been made with reference to curve 11, further analysis will prove that the three-step slope increment technique will hold for all monotonic curves. It should also be noted that using the three-step slope increment technique, after the best approximating segment has been found with coarse increments, no more than an additional ten (10) medium increments and ten (10) fine increments are needed to pinpoint the optimum segment. This technique keeps the computer time at a minimum while at the same time maintaining a high degree of sensitivity so that the optimum approximating segment is found.

For simplicity of this discussion the Incremental Slope Method was initiated using a least squares approximation for the first segment. It should be appreciated that the first segment can also be calculated using the Incremental Slope Method by first setting a dummy segment. That is, since there is no value for slope and breakpoint error from the previous segment for incremental slope initiation, dummy values must be set. For example, if the monotonic curve to be linearized is an increasing (decreasing) function, set the dummy value for the breakpoint at the initial data point $(x_o, y_o)$ and set the dummy value for slope at zero, then initiate the slope increments in the positive (negative) direction. One restriction for using the Incremental Slope Method on the first segment may be that the initiating point $(x_o, y_o)$ is on the curve. Alternatively, the initial segment may be determined by incrementing with respect to the slope of the curve at an axis intercept. Incrementing with coarse increments will then proceed in one direction and then the other.

The discussion so far has shown how the Incremental Slope Method is unique for digital linearization applications. The method provides for optimum fit and continuity through the approximating segments. The sensitivity of the method's approximation is limited only by the reliability of the input data to the computer.

A general purpose computer program "TCLIN" will now be discussed which utilizes the Incremental Slope Method to linearize, for example, a thermocouple curve. The program operator chooses the thermocouple to be linearized so that its respective data file is stored in the computer. The operator also chooses the range of approximation and the initiating limit of error E. The program then begins to linearize the curve via the Incremental Slope technique. If more than 10 segments are required (the typical NUMATRON System maximum segment capability) the program returns "-CURVE CANNOT BE APPROXIMATED WITHIN SPECIFIED ERROR BY TEN SEGMENTS." The operator has the option of decreasing the range of the approximation or increasing the limit of error. If the original approximation takes less than ten segments, the operator then has a "maximum segment" option, whereby the computer automatically decreases the initiating limit of error by 0.1° for example until all ten segments are used and the best approximation is made within the specified range using 100 percent of NUMATRON system's capabilities.

The most critical values on the computer printout are preset 1 and preset 2, corresponding to slope and intercept of each approximating segment as well as pickoff, which indicates each segment's position on the curve, i.e., its breakpoint. In actuality, these values represent the software logic design which is directly incorporated into a NUMATRON system hardware design via printed-circuit program cards to be described later.

TCLIN is a general conversational continuous linearization program designed to provide the best 10-segment approximation to a given data set. It is applicable to the complete set of thermocouple data files as well as to any file of discrete data points. With minor modifications, TCLIN will be applicable to analytic expressions such as polynomial equations as well as discrete data. While it was written specifically for application with a typical NUMATRON system, TCLIN is easily modified for general use.

The completely conversational nature of TCLIN makes it extremely straight-forward to use, even for persons with no previous programming experience.

PROGRAM DESCRIPTION

A. OPTIONS

To insure complete generality, TCLIN contains the following built-in options:

1. Input file variation—The user will be prompted for file name, at which time he may designate the data of his choice to be linearized.
2. Range variation—The user has the power to specify the temperature range over which the input data is to be linearized. In many cases, this range will be only a small subset of the data on file, so neither low end nor high end is fixed.
3. Variation of interval between data points—As the chosen range decreases, the accuracy provided by data at large intervals may prove insufficient. On the other hand, as the chosen range grows, the extra accuracy provided by data at small intervals may prove meaningless. Therefore, provision has been made for the user to choose the density of his input data points. His choice is coarse approximation (every other data point: 10° steps Centigrade or 20° steps Fahrenheit) or fine approximation (every data point: 5° steps Centigrade or 10° steps Fahrenheit).
4. Automatic error adjustment—Depending upon which temperature range is chosen, the number of segments required to perform linearization within the specified error will vary. The user has the option to institute an automatic adjustment mechanism which reduces the allowed error until all 10 segments (or as many segments as possible) have been used. A listing of the final maximum error and the number of segments used is included in the output.
5. Curtailed output—TCLIN will always list the number of segments and final maximum error for the total curve, as well as slope, intercept, span, pickoff, preset 1 and preset 2 for each segment. For immediate application, however, the user may not require a point-by-point comparison between the linearized data and the input data. This listing, therefore, can be deleted or directed onto a disk file for later printing

B. ALGORITHMS

Because of the requirement of continuity at the junction points between segments, two different algorithms have been used to calculate the straight line approximations.

1. Least Squares Approximation. This method provides the maximum length segment for any given error. That is, it includes the largest possible number of data points per segment by taking every point within the segment into account when calculating slope and intercept for that segment. Because the resulting line makes use of these intermediate points, its begin-point cannot be set in advance. Thus, this algorithm can be used for the first segment only.

Basically, the algorithm minimizes the sum of the squared differences between the true data and the calculated approximation.

2. Incremental Slope Algorithm. This method takes advantage of the high-speed computer's ability to perform a large number of iterative operations in a short time. In theory, the method is quite straightforward. The computer checks the endpoint of the segment last calculated. If the error at that point is positive (i.e., the calculated temperature is greater than the true temperature) then the slope of the new segment must be smaller than the slope of the last segment in order for the approximation not to diverge from the true curve. The opposite is true for a negative error at the endpoint.

Having decided on the sign of the error, the computer increments the slope of the new segment in the proper direction, and, using the new slope and the endpoint of the previous segment, calculates a new intercept. It then calculates as many points as possible until the error at any point becomes too large, at which point it saves the number of data points used. This procedure is repeated until the number of points used decreases, indicating that the optimal slope has been passed. It then steps back one increment and searches with increments one-tenth and finally one-one-hundredth the original size, thereby pin-pointing the best slope.

3. Maximization of number of segments (optional). Before printing the final results, the program checks whether all ten segments have been used. If so, it goes ahead with the printing. If not, it lowers the allowed error by 0.1° and sets the indicator "-FLAG2" equal to 1 to show that segment maximization is in progress. This process is repeated until ten or more segments are used.

When the number of segments needed becomes greater than ten, allowable error is increased by 0.1°, insuring that the number of segments needed will be the maximum less than or equal to 10. The indicator "FLAG3" is set to 1, showing that no further error incrementation is needed. FLAG3 is also set to 1 if the user does not opt for maximum number of segments, since if FLAG3 equals 1 the printing will proceed no matter how many segments have been used.

If more than ten segments have been used and FLAG2 is 0, then the curve cannot be approximated in 10 segments within the original error, and this information is printed. If, however, more than ten segments are needed and FLAG2 is 1, then the program has merely incremented error once too often. This is easily corrected by adding one increment to error and noting that the program should terminate with the resulting set of segments.

C. STRUCTURE

Because of the magnitude of the program, TCLIN has been divided into a main program plus six subroutines, each of which performs a specialized task. The six subroutines are:

1. INPUT: This routine conversationally allows the user to perform the above options as well as initialize certain input parameters. The conversational nature of the routine makes the program extremely straightforward to operate.
2. FILTYP: Called by INPUT, this routine decides which data file has been chosen and returns its characteristics for printing by INPUT.
3. READIN: Provided with the name of the file to be processed and the range to be linearized within that file, READIN retrieves the proper data from storage and prepares it for use. This preparation includes shifting the data points until the point with subscript 0 has the value 0. This shift is made necessary by the generality of the program, which must accept blocks of data much smaller than the maximum variable dimension and which are, therefore, misaligned with respect to subscript.
4. LSTSQR: This routine calculates the first segment using the least squares criterion as described above. It returns values for slope, intercept, segment length and segment end-points.
5. NUSLOP: The basis of the Incremental Slope Algorithm is contained in this routine, which provides an updated value for segment slope and intercept based upon the old value and the present state of the algorithm. Slope is updated by adding successively smaller increments to an initial estimate. Increment size is reduced each time incrementation by the previous size produces a decline in segment length.

NUSLOP features the ability to store the final values obtained by the large and medium size steps and to search values both slightly lower and slightly higher to obtain optimal results. Bookkeeping is done by the counter "FLAG" which keeps track of how many times the routine has been called, and therefore of what value of increment should be used.

6. QUIT: This is an output routine which tabulates segments, breakpoints, preset values and segment lengths. Depending upon the point-list option described above, it also tabulates true temperature, thermocouple EMF, amplified EMF, approximate temperature and error for each data point either at the terminal or onto a disk file called PTLIST for later printing. If the latter option is chosen, typing "SCHED(PRINT)" at the termination of the program will cause the disk file to be printed at a high-speed printer. For this option, approximately 1 minute per 100° should be allowed for program termination.

D. ERROR CRITERION

Regardless of which algorithm is being implemented, an absolute error check is the basis for determining the length of a segment. Using the calculated slope and intercept, the computer applies the straight-line formula to each independent variable value (millivolts) and determines an approximate dependent variable value (temperature). If the absolute difference between the latter and the true temperature at any point within the segment is greater than a predetermined amount, the segment has included one point too many and a final segment is calculated using one point fewer.

The following is a list of variables appearing in TCLIN and their definitions. Variables used in subroutines only will be preceded by an *. Subscripted variables (arrays) will be followed by their range of subscripts.

*B (appears in LSTSQR) — sum of independent variable values for least squared segment calculation.

BP(10) — number of counts at begin-point of each segment: pickoff.

*C (appears in LSTSQR) — sum of dependent variable values for least squared segment calculation.

*CHAR1 (appears in QUIT) — character string representation of my output of sensor.

*CHAR2 (appears in QUIT) — character string representation of my output of pre-amplifier.

*CHAR3 (appears in QUIT) — character string representation of linearized approximation.

*CHAR4 (appears in QUIT) — character string representation of error at each data point.

C1(10) — preset 2 for each segment; intercept or complement of intercept, whichever is positive.

*D (appears in LSTSQR) — sum of independent variable values multiplied by dependent variable values for least squared segment calculation.

*DELT (appears in QUIT) — denominator (determinant of Cramer's rule matrix: $E* N+1)-B^2$) used in least squared segment calculation.

DIFF(-38:353) — deviation of approximation from true curve at each point.

*E (appears in LSTSQR) — sum of independent variable values squared for least squared segment calculation.

END(10) — endpoint independent variable value of each segment.

ERROR — maximum allowable deviation from true curve; chosen by user.

FLAG — indicator: used in LSTSQR to indicate the ERROR has been exceeded, and in NUSLOP to record status of INC.

FLAG1 — indicator used to show that INC has taken on every required value and NUSLOP need not be recalled (NUSLOP will be called unless FLAG1=0).

FLAG2 — indicator used to show that maximum number of segments option has been implemented.

FLAG3 — indicator to show final pass through program; maximum number of segments have been calculated.

GAIN — gain of pre-amplifier; chosen by user.

H — index of highest data point in desired range = HIGH/STEP.

*HI (appears in READIN) — index of Y containing highest point in data file.

HIGH — high end of temperature range to be linearized.

INC — slope increment used in Incremental Slope Algorithm.

*INTVAL (appears in INPUT) — chosen interval between data points in degrees; character string representation.

K — index of endpoint of segment N (or begin-point of segment N+1) during calculation of segment N+1.

K2 — counter storing largest number of data points used in each Incremental Slope calculation.

L — index showing segment number; final value indicates total number of segments used.

*LINE(121) (appears in QUIT) — character string of length 121 containing CHAR1 through CHAR4 to be written on disk file.

*LO (appears in READIN) — index of Y containing data point 0.

LOW — low end of temperature range to be linearized.

*MAX (appears in INPUT and FILTYP) — indicates high end of maximum range of curve to be linearized.

*MIN (appears in INPUT and FILTYP) — indicates low end of maximum range of curve to be linearized.

N — number of points (excluding begin-point) in each segment; incremented during segment calculation.

N1 — complement of slope for each segment; preset 1.

*NAME (appears in INPUT and FILTYP) — name of chosen data file.

*NMED (appears in NUSLOP) — length of best segment in Incremental Slope Algorithm after medium value of positive INC.

*NNEG (appears in NUSLOP) — length of resulting segment in Incremental Slop Algorithm after medium value of negative INC.

*NPOS (appears in NUSLOP) — length of best segment in Incremental Slope Algorithm after smallest value of INC in original direction.

*NSM (appears in NUSLOP) — length of best segment in Incremental Slope Algorithm after smallest value of INC.

NUM — maximum number of segments option indicator.

PTS — point-by-point list option indicator.

REPLY — dummy input character string.

*SKIP (appears in READIN) — indicator showing whether every data point or every other data point is to be used.

SLOPE(10) — slope of each segment.

*SLOPE1 (appears in NUSLOP) — value of slope of best segment in Incremental Slope Algorithm after smallest value of INC in original direction

*SLOPE2 (appears in NUSLOP) — value of slope of best segment in Incremental Slope Algorithm after medium value of INC.

*SLOPE3 (appears in NUSLOP) — value of slope in Incremental Slope Algorithm after largest value of INC.

SPAN(10) — length of each segment in engineering units.

STEP — interval between data points; numerical representation.

T(-38:353) — dependent variable (temperature); true curve.

*TITLE (appears in INPUT and FILTYP) — title of chosen data file.

TURN — dummy input character string.

TYPE — temperature scale of chosen data file (Fahrenheit or Centigrade).

X(-38:353) — independent variable (mv).

*Y(-38:353) (appears in READIN) — dummy array containing data points; processed and transferred to X.

YCALC(-38:353) — approximation to dependent variable; linearized curve.

YCEPT(10) — intercept for each segment.

*YCEPT1 (appears in NUSLOP) — intercept of best segment in Incremental Slope Algorithm after smallest value of INC in original direction.
*YCEPT2 (appears in NUSLOP) — intercept of best segment in Incremental Slope Algorithm after medium value of INC.
*YCEPT3 (appears in NUSLOP) — intercept in Incremental Slope Algorithm after largest value of INC.

The following sets forth the numbered instructions in the main program followed by the instructions of the subroutines. This program and the subroutines may be performed by accessing a computer at an IBM 2741 terminal.

TCLIN

```
10.              DECLARE X(-38:353) DEC(6), SLOPE(10) DEC(6),
                 YCEPT(10) DEC(6), BP(10) DEC(6);
20.              DECLARE INPUT ENTRY EXT;
30.              DECLARE NUSLOP ENTRY EXT;
40.              DECLARE LSTSQR ENTRY EXT, READIN ENTRY EXT, QUIT
                 ENTRY EXT;
50.              DECLARE REPLAY CHAR(20) VAR;
60.              DECLARE N1(10) DEC(6), C1(10) DEC(6), YCALC(-38:
                 353) DEC(6);
70.              DECLARE T(-38:353) DEC(6);
80.              DECLARE SPAN(10) DEC(6), DIFF(-38:353) DEC(6);
90.              DECLARE TYPE CHAR(10);
100.             DECLARE TURN CHAR(1), NUM CHAR(1), PTS CHAR(1);
110.             PUT LIST('TURN TO NEW PAGE AND PRESS RETURN TO
                 BEGIN EXECUTION');
120.             READ INTO(TURN);
130.             CALL INPUT(REPLY,LOW,HIGH,STEP,TYPE,ERROR,PTS,
                 NUM,GAIN);
140.             CALL READIN (REPLY,LOW,HIGH,STEP,TYPE,X);
150.             X=GAIN*.001*X;
160.             FREE READIN;
170.             FREE INPUT;
180.             FLAG2=0;
190.             FLAG3=0;
200.             H=HIGH/STEP;
210.   START:    Z=LOW/STEP;
220.             DO I=LOW/STEP TO HIGH/STEP;
230.             T(I)=STEP*I;
240.             END;
250.             FLAG=0;
260.             K=Z;
270.             L=1;
280.             N=2;
290.             IF N+K>H THEN N=1;
300.             CALL LSTSQR(X,T,N,L,H,K,ERROR,FLAG,SLOPE,YCEPT,
                 YCALC,DIFF);
310.   SEE:      IMAGE;
SEGMENT #--:     SLOPE = ----.--  INTERCEPT = ----.--
320.   FOUR:     K=K+N;
330.             PUT IMAGE(L,SLOPE(L),YCEPT(L))(SEE);
340.             SPAN(L)=STEP*N;
350.             BP(L)=10000*X(Z);
360.             IF MOD(BP(L),10)<.5 THEN BP(L)=BP(L)+1;
370.             IF MOD(BP(L),10)>9.5 THEN BP(L)=BP(L)-1;
380.             DECLARE END(10) DEC(6);
390.             END(L)=X(K);
400.             N1(L)=10000*SLOPE(L);
410.             IF YCEPT(L)<0 THEN C1(L)=10000+YCEPT(L); ELSE C1(L)
                 =YCEPT(L);
```

TCLIN

```
420.            IF K>=H&NUM='1' THEN GO TO MANY;
430.            IF K>=H&NUM='0' THEN GO TO QUIT;
440.            Z=K;
450.            FLAG=0;
460.            FREE LSTSQR;
470.   LOOP2:   IF DIFF(K)<=0 THEN INC=.01*SLOPE(L); ELSE INC=
                   -.01*SLOPE(L);
480.            L=L+1;
490.            IF L>10 THEN GO TO MANY;
500.            K2=0;
510.            SLOPE(L)=SLOPE(L-1);
520.   ONE:     SLOPE(L)=SLOPE(L)+INC;
530.            YCEPT(L)=END(L-1)*(SLOPE(L-1)-SLOPE(L))+YCEPT(L-1);
540.            N=1;
550.   TWO:     M=K+N;
560.            YCALC(M)=SLOPE(L)*X(M)+YCEPT(L);
570.            DIFF(M)=YCALC(M)-T(M);
580.            IF ABS(DIFF(M))<ERROR THEN GO TO GO;
590.            N=N-1;
600.            IF K2>N THEN GO TO BIG;
610.            K2=N;
620.            GO TO ONE;
630.   GO:      N=N+1;
640.            IF K+N>H THEN GO TO TWO;
650.            N=N-1;
660.            GO TO FOUR;
670.   BIG:     IF FLAG=0 THEN FLAG=1;
680.            CALL NUSLOP(SLOPE,INC,YCEPT,END(L-1),SLOPE(L-1),
                   YCEPT(L-1),FLAG,K2,FLAG1,L);
690.            IF FLAG1>.5 THEN GO TO ONE; ELSE GO TO SEVEN;
700.   SEVEN:   N=K2;
710.            DO I=K TO K+N;
720.            YCALC(I)=SLOPE(L)*X(I)+YCEPT(L);
730.            DIFF(I)=YCALC(I)-T(I);
740.            END;
750.            GO TO FOUR;
760.   MANY:    PUT LIST(' ');
770.            IF L=10!FLAG3=1 THEN GO TO QUIT;
780.            IF L>10&FLAG2=1 THEN GO TO TERM;
790.            IF L>10&FLAG2=0 THEN GO TO OOPS;
800.            ERROR=ERROR-.1;
810.            IF ERROR<.5 THEN FLAG3=1;
820.            FLAG2=1;
830.            GO TO START;
840.   TERM:    ERROR=ERROR+.1;
850.            FLAG3=1;
860.            GO TO START;
870.   OOPS:    PUT LIST('CURVE CANNOT BE APPROXIMATED WITHIN
                   SPECIFIED ERROR BY 10 SEGMENTS');
880.   QUIT:    PUT LIST(' ');
890.            FREE NUSLOP;
900.            CALL QUIT(L,SPAN,BP,N1.C1,T,X,YCALC,DIFF,LOW,
                   STEP,PTS,ERROR,NUM,GAIN);
910.   STOP:    END;
```

INPUT

```
10.     INPUT:     PROCEDURE (REPLY,LOW,HIGH,STEP,TYPE,ERROR,PTS,
                   NUM,GAIN);
20.                DECLARE TITLE CHAR(20) VAR, INTVAL CHAR(2);
30.                DECLARE NAME CHAR(20) VAR;
40.                DECLARE FILTYP ENTRY EXT;
50.                PUT LIST('ENTER NAME OF DATA FILE TO BE APPROXIMATED');
60.     FILIN:     READ INTO(REPLY);
70.                CALL FILTYP(REPLY,TYPE,MAX,MIN,TITLE);
80.                PUT IMAGE(TITLE,TYPE,MIN,MAX,TYPE) (F);
90.     F:         IMAGE;
-------------------CURVE IN DEGREES ------------; MAXIMUM RANGE IS ---
                   TO ----- -----------DEGREES.
100.               FREE FILTYP;
110.               PUT LIST(' ');
120.               PUT LIST('ENTER THE DESIRED INTERVAL BETWEEN DATA
                   POINTS');
130.               PUT LIST('YOUR CHOICE IS 5- OR 10-DEGREE STEPS
                   CENTIGRADE');
140.               PUT LIST('OR 10- OR 20-DEGREE STEPS FAHRENHEIT');
150.               READ INTO(INTVAL);
160.               IF INTVAL='5' THEN INTVAL='05';
170.               STEP=FLOAT(INTVAL);
180.               PUT LIST(' ');
190.               PUT LIST('ENTER VALUES FOR LOW AND HIGH ENDS OF RANGE
                   DESIRED');
200.               PUT IMAGE(STEP,TYPE)(G);
210.    G:         IMAGE;
VALUES FOR LOW AND HIGH ENDS MUST BE MULTIPLES OF -- ---------DEGREES
220.               PUT LIST(' ');
230.               GET LIST(LOW,HIGH);
240.               PUT LIST(' ');
250.               PUT LIST('ENTER MAXIMUM ALLOWABLE ERROR');
260.               PUT LIST(' ');
270.               GET LIST(ERROR);
280.               PUT LIST(' ');
290.               PUT LIST('ENTER PRE-AMPLIFIER GAIN');
300.               PUT LIST(' ');
310.               GET LIST(GAIN);
320.               PUT LIST(' ');
330.               PUT LIST('ENTER 1 IF IMMEDIATE POINT BY POINT LIST IS
                   REQUIRED,');
340.               PUT LIST('2 IF LIST IS TO BE WRITTEN ON FILE FOR
                   LATER PRINTING,');
350.               PUT LIST('OR 0 IF NO LIST IS DESIRED');
360.               READ INTO(PTS);
370.               PUT LIST(' ');
380.               PUT LIST('ENTER 1 FOR MAXIMUM NUMBER OF SEGMENTS, 0
                   FOR FIXED ERROR');
390.               READ INTO(NUM);
400.               PUT LIST(' ');
410.               RETURN;
420.               END INPUT;
```

FILTYP

```
10.    FILTYP:  PROCEDURE (REPLY,TYPE,MAX,MIN,TITLE);
20.    UP:      REPLY=UPCASE(REPLY);
30.             TITLE='NONE';
40.             IF SUBSTR(REPLY,1,1)='C' THEN TYPE='CENTIGRADE';
                ELSE TYPE='FAHRENHEIT';
50.             IF REPLY='CTYPJ' THEN MAX=870;
60.             IF REPLY='CTYPJ' THEN MIN=-190;
70.             IF REPLY='CTYPJ'!REPLY='FTYPJ' THEN TITLE='IRON CON-
                                                         STANTAN';
80.             IF REPLY='FTYPJ' THEN MIN=-310;
90.             IF REPLY='FTYPJ' THEN MAX=1600;
100.            IF REPLY='FTYPK' THEN MAX=2490;
110.            IF REPLY='FTYPK'!REPLY='CTYPK' THEN MIN=0;
120.            IF REPLY='FTYPK'!REPLY='CTYPK' THEN TITLE='CHROMEL
                ALUMEL';
130.            IF REPLY='CTYPK' THEN MAX=1370;
140.            IF REPLY='CTYPT'!REPLY='FTYPT' THEN TITLE='COPPER
                CONSTANTAN';
150.            IF REPLY='CTYPT' THEN MAX=395;
160.            IF REPLY='CTYPT' THEN MIN=-190;
170.            IF REPLY='FTYPT' THEN MAX=750;
180.            IF REPLY='FTYPT' THEN MIN=-310;
190.            IF REPLY='CTYPS'!REPLY='FTYPS' THEN TITLE='PLAT+
                10%R-HOD V PLAT';
200.            IF REPLY='CTYPS' THEN MAX=1765;
210.            IF REPLY='CTYPS'!REPLY='FTYPS'!REPLY='CTYPR'!
                REPLY='FTY PR' THEN MIN=0;
220.            IF REPLY='FTYPS' THEN MAX=3210;
230.            IF REPLY='CTYPR'!REPLY='FTYPR' THEN TITLE=
                'PLAT+13%R-HOD V PLAT';
240.            IF REPLY='CTYPR' THEN MAX=1695;
250.            IF REPLY='FTYPR' THEN MAX=3090;
260.            IF REPLY='CTYPE'!REPLY='FTYPE' THEN TITLE='CHROMEL
                CONSTANTAN';
270.            IF REPLY='CTYPE' THEN MAX=1000;
280.            IF REPLY='CTYPE' THEN MIN=-200;
290.            IF REPLY='FTYPE' THEN MAX=1830;
300.            IF REPLY='FTYPE' THEN MIN=-320;
310.            IF TITLE='NONE' THEN PUT LIST('FILE',REPLY,'NOT
                AVAILABLE, PLEASE REENTER');
320.            IF TITLE='NONE' THEN READ INTO(REPLY) ; ELSE
330.            RETURN; GO TO UP;
340.            RETURN;
350.            END FILTYP;
```

READIN

```
10.   READIN:   PROCEDURE (REPLY,LOW,HIGH,STEP,TYPE,X);
20.             DECLARE NAME CHAR(20) VAR, IN FILE INPUT;
30.             DECLARE Y(-38:353) DEC(6);
40.             ON ERROR GO TO ERR;
50.             I=LENGTH(REPLY);
60.             IF SUBSTR(REPLY,I,1)='''' THEN REPLY=SUBSTR(REPLY,1,I-1);
70.             IF SUBSTR(REPLY,1,1)='''' THEN REPLY=SUBSTR(REPLY,2);
80.             NAME=ACCT!!'.'!!SUBACC!!'.'!!UPCASE(REPLY);
90.             OPEN FILE(IN) TITLE(NAME);
100.            Y=999.9;
110.            READ FILE(IN) INTO(Y);
120.  TOP:      LO=-38;
130.            HI=353;
140.  LOEND:    IF Y(LO)=0 THEN GO TO HIEND;
150.            LO=LO+1;
160.            GO TO LOEND;
170.  HIEND:    IF Y(HI)>=900 THEN HI=HI-1; ELSE GO TO JUGGLE;
180.            GO TO HIEND;
190.  JUGGLE:   DO Q=HI TO -38 BY -1;
200.            Y(Q-LO)=Y(Q);
210.            END;
220.            X=0;
230.            IF STEP=10&TYPE='FAHRENHEIT' THEN SKIP=1; ELSE SKIP=2;
240.            IF STEP=5 THEN SKIP=1;
250.            DO I=0 TO HIGH/STEP, 0 TO LOW/STEP BY -1;
260.            X(I)=Y(I*SKIP);
270.            END;
280.            RETURN;
290.  ERR:      IF ONCODE=206 THEN GO TO TOP; ELSE PUT LIST ('ERROR:', ONCODE);
300.            CLOSE FILE(IN);
310.            RETURN;
320.            END READIN;
```

NUSLOP

```
10.   NUSLOP:   PROCEDURE (SL,INC,YCPT,END,OLDSL,OLDCPT,FL,K2,FLG1,L);
20.             SL(L)=SL(L)-INC;
30.             YCPT(L)=END*(OLDSL-SL(L))+OLDCPT;
40.             IF FL=1 THEN GO TO SAVE;
50.             IF FL]3!SL(L)]=SLOPE3 THEN GO TO SKIP;
60.             INC=-INC;
70.             FL=4;
80.   SKIP:     IF FL]=6!SL(L)]=SLOPE3 THEN GO TO CHOOSE;
90.             GO TO FIVE;
100.  CHOOSE:   IF FL=2! FL=5 THEN GO TO SAVE1;
110.            IF FL=3! FL=6 THEN GO TO SAVE2;
120.            IF FL=4 THEN GO TO FOUR;
130.            GO TO TWO;
140.  SAVE:     SLOPE3=SL(L);
150.            YCEPT3=YCPT(L);
160.            NNEG=K2;
170.            GO TO POSL;
```

FILTYP

```
10.   FILTYP:  PROCEDURE (REPLY,TYPE,MAX,MIN,TITLE);
20.   UP:      REPLY=UPCASE(REPLY);
30.            TITLE='NONE';
40.            IF SUBSTR(REPLY,1,1)='C' THEN TYPE='CENTIGRADE';
               ELSE TYPE='FAHRENHEIT';
50.            IF REPLY='CTYPJ' THEN MAX=870;
60.            IF REPLY='CTYPJ' THEN MIN=-190;
70.            IF REPLY='CTYPJ'!REPLY='FTYPJ' THEN TITLE='IRON CON-
                                                         STANTAN';
80.            IF REPLY='FTYPJ' THEN MIN=-310;
90.            IF REPLY='FTYPJ' THEN MAX=1600;
100.           IF REPLY='FTYPK' THEN MAX=2490;
110.           IF REPLY='FTYPK'!REPLY='CTYPK' THEN MIN=0;
120.           IF REPLY='FTYPK'!REPLY='CTYPK' THEN TITLE='CHROMEL
               ALUMEL';
130.           IF REPLY='CTYPK' THEN MAX=1370;
140.           IF REPLY='CTYPT'!REPLY='FTYPT' THEN TITLE='COPPER
               CONSTANTAN';
150.           IF REPLY='CTYPT' THEN MAX=395;
160.           IF REPLY='CTYPT' THEN MIN=-190;
170.           IF REPLY='FTYPT' THEN MAX=750;
180.           IF REPLY='FTYPT' THEN MIN=-310;
190.           IF REPLY='CTYPS'!REPLY='FTYPS' THEN TITLE='PLAT+
               10%R-HOD V PLAT';
200.           IF REPLY='CTYPS' THEN MAX=1765;
210.           IF REPLY='CTYPS'!REPLY='FTYPS'!REPLY='CTYPR'!
               REPLY='FTY PR' THEN MIN=0;
220.           IF REPLY='FTYPS' THEN MAX=3210;
230.           IF REPLY='CTYPR'!REPLY='FTYPR' THEN TITLE=
               'PLAT+13%R-HOD V PLAT';
240.           IF REPLY='CTYPR' THEN MAX=1695;
250.           IF REPLY='FTYPR' THEN MAX=3090;
260.           IF REPLY='CTYPE'!REPLY='FTYPE' THEN TITLE='CHROMEL
               CONSTANTAN';
270.           IF REPLY='CTYPE' THEN MAX=1000;
280.           IF REPLY='CTYPE' THEN MIN=-200;
290.           IF REPLY='FTYPE' THEN MAX=1830;
300.           IF REPLY='FTYPE' THEN MIN=-320;
310.           IF TITLE='NONE' THEN PUT LIST('FILE',REPLY,'NOT
               AVAILABLE, PLEASE REENTER');
320.           IF TITLE='NONE' THEN READ INTO(REPLY) ; ELSE
330.           RETURN; GO TO UP;
340.           RETURN;
350.           END FILTYP;
```

READIN

```
10.     READIN:    PROCEDURE (REPLY,LOW,HIGH,STEP,TYPE,X);
20.                DECLARE NAME  CHAR(20) VAR, IN FILE INPUT;
30.                DECLARE Y(-38:353) DEC(6);
40.                ON ERROR GO TO ERR;
50.                I=LENGTH(REPLY);
60.                IF SUBSTR(REPLY,I,1)='''' THEN REPLY=SUBSTR(REPLY,1,
                   I-1);
70.                IF SUBSTR(REPLY,1,1)='''' THEN REPLY=SUBSTR(REPLY,2);
80.                NAME=ACCT!!'.'!!SUBACC!!'.'!!UPCASE(REPLY);
90.                OPEN FILE(IN) TITLE(NAME);
100.               Y=999.9;
110.               READ FILE(IN) INTO(Y);
120.    TOP:       LO=-38;
130.               HI=353;
140.    LOEND:     IF Y(LO)=0 THEN GO TO HIEND;
150.               LO=LO+1;
160.               GO TO LOEND;
170.    HIEND:     IF Y(HI)>=900 THEN HI=HI-1; ELSE GO TO JUGGLE;
180.               GO TO HIEND;
190.    JUGGLE:    DO Q=HI TO -38 BY -1;
200.               Y(Q-LO)=Y(Q);
210.               END;
220.               X=0;
230.               IF STEP=10&TYPE='FAHRENHEIT' THEN SKIP=1; ELSE
                   SKIP=2;
240.               IF STEP=5 THEN SKIP=1;
250.               DO I=0 TO HIGH/STEP, 0 TO LOW/STEP BY -1;
260.               X(I)=Y(I*SKIP);
270.               END;
280.               RETURN;
290.    ERR:       IF ONCODE=206 THEN GO TO TOP; ELSE PUT LIST
                   ('ERROR:', ONCODE);
300.               CLOSE FILE(IN);
310.               RETURN;
320.               END READIN;
```

NUSLOP

```
10.     NUSLOP:    PROCEDURE (SL,INC,YCPT,END,OLDSL,OLDCPT,FL,K2,FLG1,L);
20.                SL(L)=SL(L)-INC;
30.                YCPT(L)=END*(OLDSL-SL(L))+OLDCPT;
40.                IF FL=1 THEN GO TO SAVE;
50.                IF FL]3!SL(L)]=SLOPE3 THEN GO TO SKIP;
60.                INC=-INC;
70.                FL=4;
80.     SKIP:      IF FL]6!SL(L)]=SLOPE3 THEN GO TO CHOOSE;
90.                GO TO FIVE;
100.    CHOOSE:    IF FL=2! FL=5 THEN GO TO SAVE1;
110.               IF FL=3! FL=6 THEN GO TO SAVE2;
120.               IF FL=4 THEN GO TO FOUR;
130.               GO TO TWO;
140.    SAVE:      SLOPE3=SL(L);
150.               YCEPT3=YCPT(L);
160.               NNEG=K2;
170.               GO TO POS1;
```

NUSLOP

```
180.    SAVE1:  SLOPE2=SL(L);
190.            YCEPT2=YCPT(L);
200.            NMED=K2;
210.    POS1:   INC=INC*.1;
220.            FL=FL+1;
230.            FLG1=1;
240.            RETURN;
250.    SAVE2:  SLOPE4=SL(L);
260.            YCEPT4=YCPT(L);
270.            NSM=K2;
280.            INC=-INC;
290.            FL=FL+1;
300.            SL(L)=SLOPE2;
310.            YCPT(L)=YCEPT2;
320.            K2=NMED;
330.            FLG1=1;
340.            RETURN;
350.    FOUR:   IF NSM>=K2 THEN GO TO THREE;
360.    NEG1:   SLOPE1=SL(L);
370.            YCEPT1=YCPT(L);
380.            NPOS=K2;
390.            FL=FL+1;
400.            K2=NNEG;
410.            SL(L)=SLOPE3;
420.            YCPT(L)=YCEPT3;
430.            INC=10*INC;
440.            FLG1=1;
450.            RETURN;
460.    THREE:  SL(L)=SLOPE4;
470.            YCPT(L)=YCEPT4;
480.            K2=NSM;
490.            GO TO NEG1;
500.    TWO:    IF NSM<K2 THEN GO TO FIVE;
510.            SL(L)=SLOPE4;
520.            YCPT(L)=YCEPT4;
530.            K2=NSM;
540.    FIVE:   IF NPOS>=K2 THEN GO TO SIX;
550.            FLG1=0;
560.            RETURN;
570.    SIX:    SL(L)=SLOPE1;
580.            YCPT(L)=YCEPT1;
590.            K2=NPOS;
600.            FLG1=0;
610.            RETURN;
620.            END NUSLOP;
```

QUIT

```
10.     QUIT:   PROCEDURE (L,SPAN,BP,N1,C1,T,X,YCALC,DIFF,LOW,STEP,
                PTS,ERROR,NUM,GAIN);
20.             ON ERROR MSG GO TO ERR1;
30.             DECLARE PTLIST FILE ENV( REGIONAL(1) F(121)
                SPACE(TRK,15));
40.             DECLARE CHARD ENTRY EXT LIB(PUBLIC), LINE CHAR(121);
50.             DECLARE CHAR1 CHAR(10) VAR, CHAR2 CHAR(10) VAR,
                CHAR3 CHAR(10) VAR, CHAR4 CHAR(10) VAR;
60.             PUT LIST ('NUMBER OF SEGMENTS USED IS',L);
70.             PUT LIST(' ');
80.             PUT LIST('MAXIMUM ERROR IS',ERROR);
90.             PUT LIST(' ');
```

```
                             QUIT
100.           PUT LIST(' ');
110.           PUT LIST('SEG           SPAN           PICKOFF
               PRE 1           PRE 2');
120.           PUT LIST(' ');
130.           DO I=1 TO L;
140.           PUT IMAGE(I,SPAN(I),B.P(I),N1(I),C1(I))(RS);
150.    RS:    IMAGE;
        ---    ----           -----          ------         -------
160.           END;
170.           PUT LIST (' ');
180.           LINE=' ';
190.           WRITE FILE(PTLIST) FROM(LINE) KEYFROM(1);
200.           IF PTS='0' THEN GO TO STOP;
210.           IF PTS='2' THEN GO TO ONE;
220.           PUT LIST('TRUE TEMP           EMF      GAIN X EMF
               LINEAR TEMP           ERROR');
230.           PUT LIST(' ');
240.    ONE:   SUBSTR(LINE,1)='1';
250.           WRITE FILE(PTLIST) FROM(LINE) KEYFROM(5);
260.           SUBSTR(LINE,1,1)=' ';
270.           SUBSTR(LINE,2,9)='TRUE TEMP';
280.           SUBSTR(LINE,21,3)='EMF';
290.           SUBSTR(LINE,39,10)='GAIN X EMF';
300.           SUBSTR(LINE,57,11)='LINEAR TEMP';
310.           SUBSTR(LINE,78,5)='ERROR';
320.           WRITE FILE(PTLIST) FROM(LINE) KEYFROM(6);
330.           LINE=' ';
340.           WRITE FILE(PTLIST) FROM(LINE) KEYFROM(7);
350.           #LINE=8;
360.           IF PTS='2' THEN GO TO TWO;
370.           J1=LOW/STEP;
380.           X=X*1000;
390.           DO J=1 TO L;
400.           P=SPAN(J)/STEP;
410.           DO K=J1 TO J1+P;
420.           PUT IMAGE(T(K),X(K)/GAIN,X(K),YCALC(K),DIFF(K))(CHECK)
430.    CHECK: IMAGE;
        ---    ----           -----          ------         -------
440.           END;
450.           PUT LIST(' ');
460.           J1=J1+P;
470.           END;
480.           GO TO STOP;
490.    TWO:   J1=LOW/STEP;
500.           X=X*1000;
510.           DO J=1 TO L;
520.           P=SPAN(J)/STEP;
530.           DO K=J1 TO J1+P;
540.           CHAR1=CHARD(X(K)/GAIN+.000001);
550.           CHAR2=CHARD(X(K)+.000001);
560.           CHAR3=CHARD(YCALC(K)+.000001);
570.           CHAR4=CHARD(DIFF(K)+.000001);
580.           Q=X(K)/GAIN;
590.           IF FLOAT(SUBSTR(CHAR1,4+INDEX(CHAR1,'.'),1))>=5 THEN
               Q=Q+.001*SIGN(Q);
600.           IF FLOAT(SUBSTR(CHAR2,4+INDEX(CHAR2,'.'),1))>=5 THEN
               X(K)=X(K)+.001*SIGN(X(K));
610.           IF FLOAT(SUBSTR(CHAR3,3+INDEX(CHAR3,'.'),1))>=5 THEN
               YCALC(K)=YCALC(K)+.01*SIGN(Q);
```

QUIT

```
620.            IF FLOAT(SUBSTR(CHAR4,3*INDEX(CHAR4,'.'),1))>=5 THEN
                   DIFF(K)=DIFF(K)+.01*SIGN(DIFF(K));
630.            SUBSTR(LINE,1,1)=' ';
640.            SUBSTR(LINE,2,17)=CHARD(T(K));
650.            SUBSTR(LINE,19,22)=SUBSTR(CHARD(Q),1,3+INDEX(CHARD(Q)
                   '.'));
660.            SUBSTR(LINE,41,20)=SUBSTR(CHAR2,1,3+INDEX(CHAR2,'.'));
670.            SUBSTR(LINE,61,17)=SUBSTR(CHAR3,1,2+INDEX(CHAR3,'.'));
680.            SUBSTR(LINE,78)=SUBSTR(CHAR4,1,2+INDEX(CHAR4,'.'));
690.            WRITE FILE(PTLIST) FROM(LINE) KEYFROM(#LINE);
700.            #LINE=#LINE+1;
710.            END;
720.            LINE=' ';
730.            WRITE FILE(PTLIST) FROM(LINE) KEYFROM(#LINE);
740.            PUT LIST(' ');
750.            #LINE=#LINE+1;
760.            J1=J1+P;
770.            END;
780.            CLOSE FILE(PTLIST);
790.    STOP:   RETURN;
800.    ERR1:   IF ONCODE=113 THEN RETURN;
810.            PUT LIST('ERROR: ONCODE = ',ONCODE);
820.            CLOSE FILE(PTLIST);
830.            RETURN;
840.            END QUIT;
```

LSTSQR

```
10.     LSTSQR: PROCEDURE (X,T,N,L,H,K,ERROR,FLAG,SLOPE,YCEPT,
                   YCALC, DIFF);
20.     LOOP1:  B=0;
30.             C=0;
40.             D=0;
50.             E=0;
60.             DO J=K TO K+N;
70.             B=B+X(J);
80.             C=C+T(J);
90.             D=D+X(J)*T(J);
100.            E=E+X(J)*X(J);
110.            END;
120.            DELT=E*(N+1)-B*B;
130.            IF DELT=0 THEN DELT=.0001;
140.            SLOPE(L)=(D*(N+1)-C*B)/DELT;
150.            YCEPT(L)=(E*C-B*D)/DELT;
160.            DO I=K TO K+N;
170.            YCALC(I)=X(1)*SLOPE(L)+YCEPT(L);
180.            DIFF(I)=YCALC(I)-T(I);
190.            IF FLAG=1 THEN GO TO OK;
200.            IF ABS(DIFF(I))<ERROR THEN GO TO OK;
210.            FLAG=1;
220.            N=N-1;
230.            GO TO LOOP1;
240.    OK:     END;
250.            IF FLAG]=1 THEN GO TO COMP;
260.            RETURN;
```

LSTSQR

```
270.    COMP:    IF K+N7=H THEN RETURN;
280.             N=N+1;
290.             GO TO LOOP1;
300.             END LSTSQR;
```

The various instructions of the main program and subroutines will now be described with reference to the flow diagrams of FIGS. 4 and 5. Instruction 130 of the main program, TCLIN, calls up the subroutine INPUT with instruction 130. Instructions 50 and 60 of the subroutine identify the data file for the particular nonlinear function to be read in corresponding to the storage of points indicated at block 310. Instruction 140 of the main program calls subroutine READIN which retrieves at line 110 the data corresponding to the particular nonlinear function from storage and prepares it for use.

The determination of the initial segment indicated at the block 312 occurs when instruction 300 of the main program calls up the subroutine LSTSQR which performs the Least Squares method. This is followed by instruction 470 of the main program which determines the sign of the breakpoint deviation as indicated at block 314.

Instructions 510 and 520 of the main program determine the slope of the next straight line segment as part of the step indicated at block 316. Instruction 530 of the main program determines the intercept of that straight line segment. With the straight line segment determined, the independent variable, voltage in the case of the thermocouple, is incremented with instruction 560 of the main program which corresponds with block 318. Any deviation of the segment from the curve for each increment of the independent variable is now determined by instruction 570 of the main program as indicated at the block 320. If the deviation is within the error limit E, the error analysis loop is repeated with instruction 580 of the main program.

If the deviation is in excess of the error limit E, the segment length for the previous increment of the independent variable is stored as indicated at block 322 with instruction 610 of the main program. The slope is now incremented with instruction 520 which is initiated by instruction 620 as part of the incremented slope loop.

The longest segment for coarse increments in slopes is determined in the main program corresponding to block 330. Instruction 600 initiates the search for the longest segment for medium and fine increments of slope by ultimately calling up the subroutine NUSLOP with instructions 670 and 680 corresponding to blocks 332 and 334.

Finally, instruction 900 of the main program which calls up the subroutine QUIT begins the identification of the circuit connections corresponding to the block 328. Instruction 110 of subroutine QUIT is a format for identifying circuit connections corresponding to segment identifying counts, a slope count modifier $\Phi_1$ and an intercept count modifier $\Phi_2$ on the various logic cards for a NUMATRON display system. Instructions 140 and 150 of QUIT initiate a writing out of circuit connections for these cards. The segment identifying counts are the independent variable (millivolts) in terms of count for each breakpoint on the curve of the system 304 such as the NUMATRON system. These counts $N_{B1}$, $N_{B2}$, and $N_{B3}$ are discussed subsequently.

It should now be understood that any point on the curve 11 may be represented as a linear function in terms of voltage and temperature with a slope equal to the slope of a particular segment and an intercept equal to the intercept temperature of the particular segment extended to the abscissa.

Figure 6:
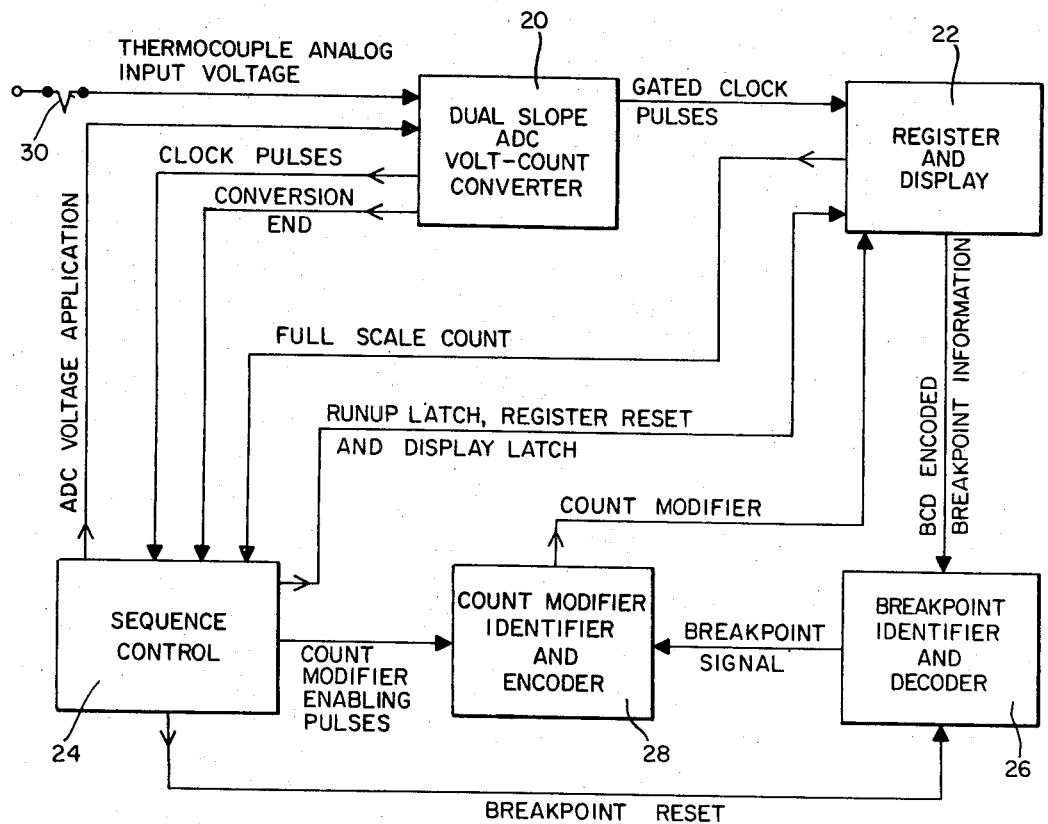
FIG. 6 is a block diagram of a system constructed using the method of this invention.

Relying on the foregoing equations, and FIG. 2, it will now be shown by reference to FIG. 6 that an instantaneous value of output representing temperature which is nonlinearly related to an instantaneous value of an analog input voltage may be obtained from a system operating in a basically linear mode if the proper approximating linear segments of the voltage-temperature function are established, the particular segment corresponding with a particular analog input voltage is digitally identified, and a digital count is accumulated which is modified by appropriate slope count modifiers and appropriate intercept count modifiers.

Referring now to FIG. 6, the system 304 including the circuit connections identified by the method of this invention will now be described. The analog input voltage from the thermocouple 30 is applied to the system including a conventional ADC 20 (analog-to-digital converter) of the dual slope volt-count type such as the AN 2317 manufactured by the Analogic Company. Characteristically, the conventional dual slope ADC has a digitizing cycle including a sampling period in which $V_{in}$ is applied to the input of the ADC and a measuring period in which a reference voltage $V_{ref}$ of opposite polarity is applied to the ADC. In the context of FIG. 3, an output voltage $V_{in}$ from the thermocouple 30 is applied to the ADC 20 in response to a signal from the sequence control 24 which is under the control of clock pulses from the ADC 20. The ADC then produces a series of gated clock pulses applied to a register 22 having a count and display capacity of 10,000 counts. After the full-scale count has accumulated in the register 22, a second counting period coinciding with a measuring period begins and a signal indicative of the full-scale count is applied to the sequence control 24 which in turn initiates the application of the reference voltage $V_{ref}$ to the ADC 20. At the end of the measuring period, the accumulated count in the register 22 is proportional to the input voltage $V_{in}$. However, since the temperature and voltage of the curve 11 are related nonlinearly, a mere proportional count accumulating in the register 22 at the end of the first digitizing cycle will not indicate the temperature which corresponds to a voltage for any point on the curve 11. But, by approximating the curve 11 by the straight-line segments 12–14 as shown in FIG. 2 and modifying the count during a second digitizing cycle by count modifiers corresponding to a particular linear segment identified during the first digitizing cycle, the proportional count produced by the ADC 20 and accumulated in the register 22 at the end of the second digitizing cycle may be utilized to indicate the desired engineering units of temperature on the curve 11.

Thus during the sampling period of the first digitizing cycle, the analog input voltage $V_{in}$ is applied to the ADC 20. A series of gated clock pulses are generated by the ADC 20 and enter the register 22 to accumulate a count therein. When a full-scale count has been accumulated in the register 22, the measuring period begins and a signal indicating the full-scale count is applied to the sequence control 24 which applies the reference voltage $V_{ref}$ to the ADC 20 and a series of gated clock pulses therefrom accumulates a count in the register 22 to precisely identify the instantaneous millivolt value of the input and to precisely identify the linear segment associated with that value. For the case of point $P_{13}$, the accumulated count in the register would identify some point on the curve 11 above the breakpoint $B_2$ and below the breakpoint $B_3$ thus completely identifying the linear segment 13.

While the count in the register 22 was accumulating during the measuring period of the identification cycle, a run-up latch signal from the sequence control 24 is applied to the register 22. As a consequence, a signal indicative of the accumulating count in the register 22 was applied to a breakpoint identifier and decoder 26 having stored breakpoint information for the curve 11. When the measuring period of the identification cycle is completed, the breakpoint identifier 26 which serves as a breakpoint identification circuit will have identified the last breakpoint which was passed as the count was accumulating and a signal so indicating will be applied to a count modifier identifier and BCD (binary coded decimal) encoder circuit 28 for the proper selection and encoding of stored slope and intercept count modifiers $\Phi_1$ and $\Phi_2$ to be inserted into the register 22 which correspond to the linear segment between the identified breakpoint and the next breakpoint. In the case of point $P_{13}$, the count modifiers $\Phi_1$ and $\Phi_2$ encoded at the BCD encoder 28 or count modifier circuit correspond to the linear segment 13, more particularly, the count modifiers correspond to a slope count modifier $\Phi_1$ of proper magnitude to satisfy the constant $N_{13}$ of later discussed Equation (6) and an intercept count modifier $\Phi_2$ of proper magnitude to satisfy the constant $C_{13}$ of Equation (6). With the count modifiers completely selected, the register 22 may be cleared or reset by appropriate signals from the sequence control 24.

During the second digitizing cycle or readout cycle, the analog input voltage $V_{in}$ and the reference voltage $V_{ref}$ are again applied to the ADC during the sampling and measuring periods. Thus, the application of the analog input voltage $V_{in}$ to the ADC 20 produces a series of gated clock pulses which accumulate another full-scale count in the register 22 during the sampling period. However, this sampling period is modified in the sense that the first of the count modifiers from the count modifier identifier 28 is applied before, during, or at the end of the sampling period so as to modify the time in which a full-scale count will be accumulated in the register 22. This first count modifier is the slope count modifier $\Phi_1$ corresponding to the slope of the segment 13 in the case of the point $P_{13}$ on the curve 11. The entry of the slope count modifier $\Phi_1$ into the register 22 is under the control of enabling pulses from the sequence control 24.

When the full-scale count is reached terminating the sampling period of the readout cycle, a signal from the register 22 is received by the sequence control 24 which produces an enabling pulse. The enabling pulse is sent from the sequence control 24 to the count modifier identifier 28 which results in the entry of the second count modifier, the intercept count modifier $\Phi_2$, into the register 22. The measuring period then begins automatically and without interruption after the full-scale count is reached while a signal from the sequence control applies $V_{ref}$ to the ADC 20. At the termination of the readout cycle, a display latch pulse is sent from the sequence control 24 to the register 22 for displaying the accumulated count. This count will actually equal the temperature in the desired engineering units, degrees C. or F., of a point on the curve 11 corresponding to an instantaneous input voltage to a very close approximation. Thus the system, by properly digitally identifying a linear segment associated with a point on the curve 11 will produce a digitally modified output in terms of temperature which is a nonlinear function of an analog input voltage by operating in a basically linear mode in accordance with one of the equations 4-6. The breakpoint identifier 26 may now be reset by a pulse from the sequence control 24.

Figure 7:
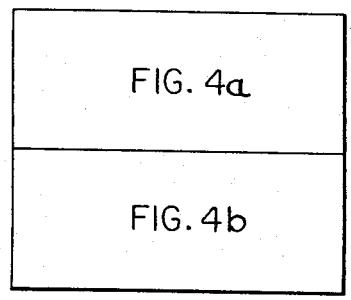
FIG. 7 illustrates the relationship of the circuit diagrams in FIGS. 7a and 7b elaborating upon the block diagram of FIG. 6.
Figure 7A:
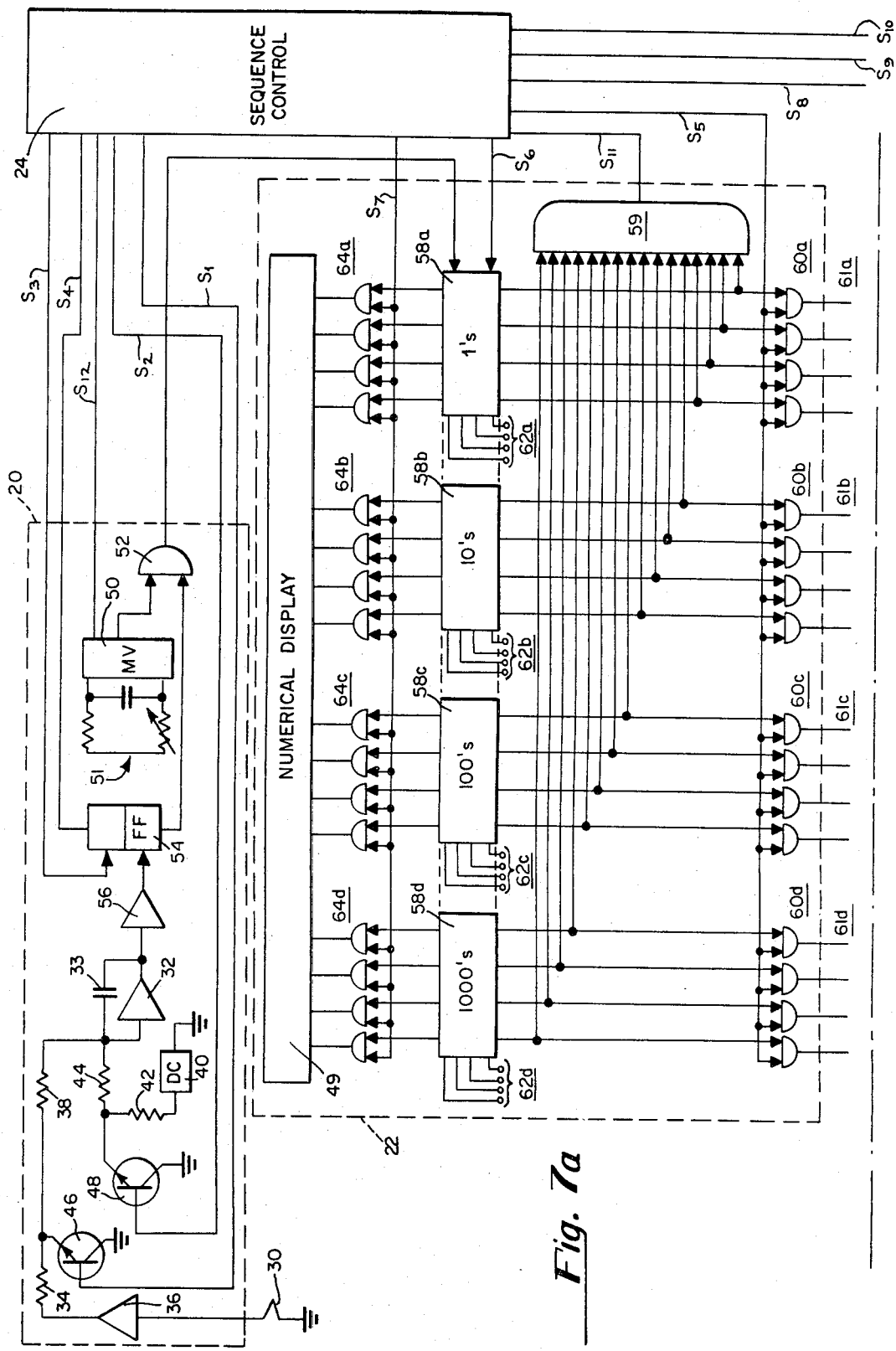
Figure 7B:
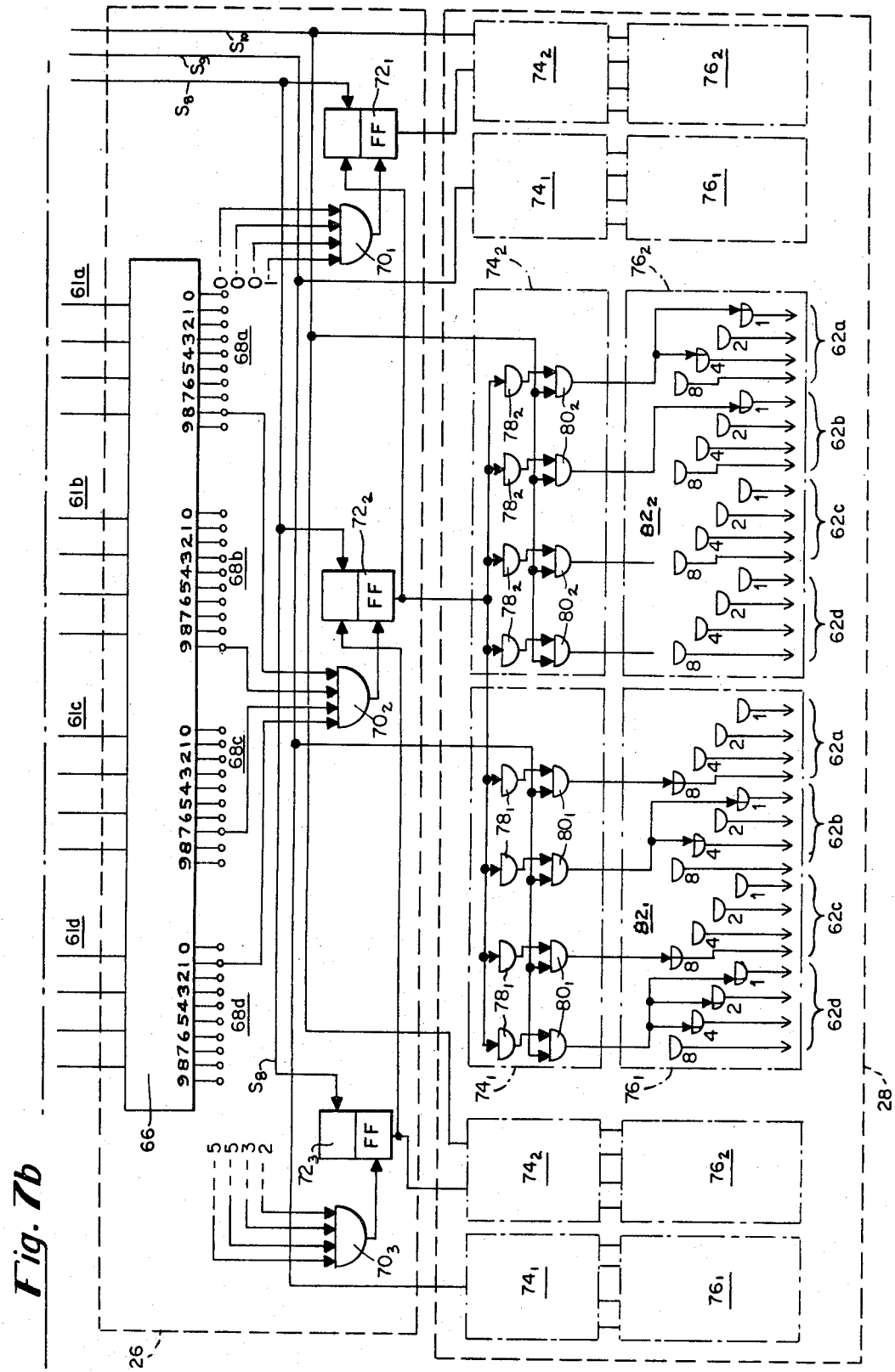
Figure 9:
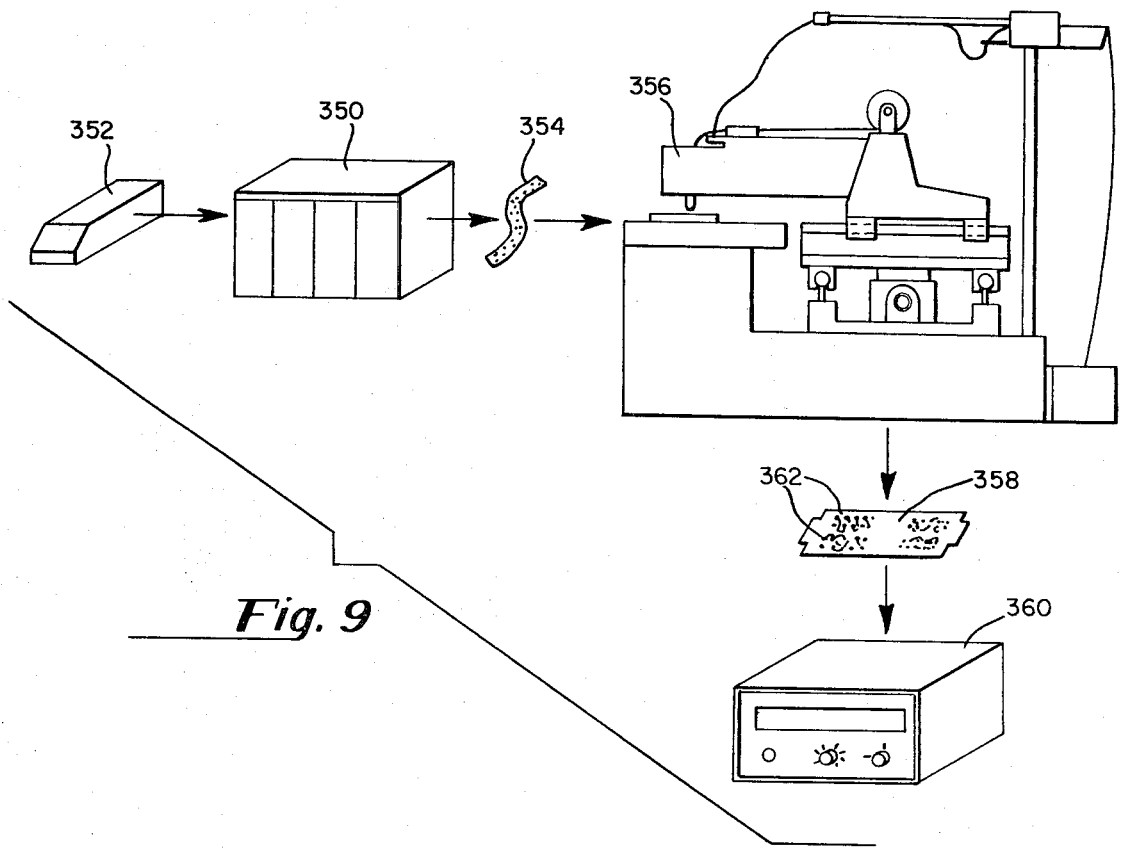
FIG. 9 is a schematic illustration of the method for constructing the system disclosed in the block diagram of FIG. 6 and the circuit diagrams of FIGS. 7a and 7b.

In order to more fully explain the function and operation of the various blocks in the block diagram of FIG. 6 and the identified circuit connections, reference is now made to the circuit diagrams of FIGS. 7a and 7b. In the interest of consistency and clarity, the various blocks of FIG. 7 corresponding to the ADC 20, the register 22, the sequence control 24, the breakpoint identifier 26 and the count modifier identifier 28 have been indicated in FIG. 7.

Referring first to the ADC 20, it will be seen that the analog input voltage $V_{in}$ is generated by a thermocouple 30 and applied to an integrating amplifier 32 through an input amplifier 36 and resistors 34 and 38. Similarly, the reference voltage $V_{ref}$ generated by a reference voltage source 40 is applied to the integrating amplifier 32 through a first resistor 42 and a second resistor 44. In accordance with the dual slope mode of operation of the ADC 20, the analog input voltage $V_{in}$ is only applied to the integrating amplifier 32 during the sampling periods of the identification and readout cycles while the reference voltage $V_{ref}$ is only applied to the integrating amplifier 32 during the measuring periods of the identification and readout cycles. In order to provide this sequential application of the voltages $V_{in}$ and $V_{ref}$ to the amplifier 32, a pair of switching transistors 46 and 48 are provided which are switched between the conductive and nonconductive states in response to signals applied to the base terminals thereof on lines $S_1$ and $S_2$ when a full-scale or zero count is reached in the register 22.

During the sampling period of both the identification and readout cycles, the transistor 48 is conductive and the transistor 46 is nonconductive so as to permit application of the input voltage $V_{in}$ to the integrating amplifier 32 while the reference voltage $V_{ref}$ is shorted to ground through the first resistor 42 and the switching transistor 48. Also during the sampling period of both the identification and readout cycles, an integrating capacitor 33 associated with the integrating amplifier 32 is being charged to an ever-increasing voltage. Concurrently, a free-running multivibrator 50 which may comprise a conventional unijunction oscillator having an RC sample rate circuit 51 is generating a series of clock pulses gated by an AND gate 52. The AND gate 52 is enabled by a decision flip-flop 54 set by a signal from the sequence control 24 on a line $S_3$ in response to clock pulses entering the register through a line $S_{12}$. When the gated clock pulses from the AND gate 52 accumulate a full-scale count in the heretofore cleared register 22, the sampling periods of both the identification and readout cycles are terminated and the measuring periods of both the identification and readout cycles are commenced.

This termination of the sampling periods and commencement of the measuring periods is accomplished by the application of a full-scale count indicating signal from the register 22 to the sequence control 24 through a line $S_{11}$ and the sequence control 24 then switches the transistor 46 to the conductive state and the transistor 48 to the nonconductive state thereby shorting the analog input voltage $V_{in}$ to ground through the resistors 34 and applying the reference voltage $V_{ref}$ to the integrating amplifier 32. Since the state of the decision flip-flop 54 was not changed in the transition between the sampling period and the measuring period and remains set, the gated clock pulses continue to enter the register 22 and accumulate a count from zero after the register is automatically cleared by reaching the full-scale count during the sampling period. During the measuring periods of both the identification and readout cycles, the reference voltage $V_{ref}$ which is of a polarity opposite to the polarity of the analog input voltage $V_{in}$ and of a magnitude at least as great as the magnitude of the voltage $V_{in}$ continues to discharge the integrating capacitor 33 until the charge on the capacitor 33 reaches zero. At that time, a zero detecting amplifier 56 interposed between the decision flip-flop 54 and the integrating amplifier 32 will produce an output signal which resets the decision flip-flop 54 thereby disabling the AND gate 52 and signaling the end of the conversion to the sequence control 24 on the line $S_4$. The gated clock pulses will then cease to enter the register 22 and the count accumulated therein will be equal to the input voltage and be indicative of a particular linear segment on the curve 11 of the voltage-temperature function. At the end of the identification cycle, the accumulated count in the register 22 will identify a particular linear segment such as the segment 13 for the point $P_{13}$. At the end of the readout cycle, the accumulated count in the register 22 will actually represent a particular temperature in desired engineering units corresponding to the instantaneous value of the analog input voltage.

Referring now to the register 22 for an explanation of the circuitry therein, four registers 58(a–d) are shown corresponding to units, tens, hundreds, and thousands digits respectively. During the identification and readout cycles, a binary coded representation of the accumulating count is applied to a full-scale count indicating AND gate 59 having an output connected to the line $S_{11}$ and applied to four sets of AND gates 60(a–d), each set having four binary coded AND gates and being associated with one of the digit registers 58(a–d). During the entire measuring period of the identification cycle, the AND gates 60(a–d) are enabled by a run-up latching pulse from the sequence control 24 on a line $S_5$. Thus, as the segment identifying count accumulates in the digit registers 58(a–d), a running count in binary form is applied to the breakpoint identifier 26 over sets of lines 61(a–d).

At the conclusion of the identification cycle and after clearance of the digit registers 58(a–d) by a clearing pulse from the sequence control 24 on a line $S_6$, each of the digit registers 58(a–d) is now ready for entry of a binary encoded count modifier from the count modifier identifier 28 on parallel entry lines 62(a–d) associated with each of the digit registers 58(a–d) respectively. Before the sampling period of the readout cycle begins, the first of the count modifiers, the slope count modifier $\Phi_1$, is entered in the digit registers 58(a–d) via lines 62(a–d). At the beginning of the measuring period of the readout cycle, the second of the modifiers, the intercept count modifier $\Phi_2$, is entered in the digit registers 58(a–d) via lines 62(a–d). At the conclusion of the measuring period of the readout cycle, the binary count accumulated in the digit registers 58(a–d) is read out to a numerical display 49 when an enabling pulse from the sequence control 24 is applied to four sets of AND gates 64(a–d) on a line $S_7$, each set of AND gates 64(a–d) having four binary coded AND gates. The digit registers 58(a–d) may now be cleared by a pulse from the sequence control 24 on the line $S_6$.

In order to obtain the appropriate count modifiers for application to lines 62(a–d), which of necessity must correspond to a particular linear segment such as the segment 13 for the point $P_{13}$, it is necessary to first identify that particular segment. This is accomplished in the breakpoint identifier 26 by a binary-to-decimal decoder 66 including conventional combination of the AND gates to convert the binary encoded breakpoint identification information from the digit registers 58(a–d) and the AND gates 60(a–d) to decimal form at decimal output terminals 68(a–d) corresponding to units, tens, hundreds, and thousands digits respectively. As the count accumulates during the measuring period of the identification cycle, the various numerical outputs associated with each of the decimal digit output terminals 68(a–d) will be sequentially energized. The various numerical terminals of the decimal digit output terminals 68(a–d) may be hard-wired in appropriate combinations to AND gates $70_1$, $70_2$, and $70_3$ corresponding to stored breakpoints $B_1$, $B_2$, and $B_3$ respectively. Each of these AND gates $70_1$, $70_2$, and $70_3$ in turn, upon being satisfied by the appropriate decoded count, set a flip-flop $72_1$, $72_2$, and $72_3$ respectively. At the beginning of the measuring period of the segment identifying cycle, the AND gate $70_1$ is enabled and the flip-flop $72_1$ is set by a count corresponding to 0001 at the decimal digit output terminals 68(a–d). As the count accumulates during the measuring period, the AND gate $70_2$ will be enabled so as to set the flip-flop $72_2$ which in turn resets the flip-flop $72_1$ if and only if the breakpoint $B_2$ is reached as in the case of the point $P_{13}$ thereby identifying the segment 13. For the point $P_{13}$, the AND gate $70_3$ will never be enabled so that the flip-flop $72_3$ will not be set. It will be understood, however, that if the point under consideration is $P_{14}$, the AND gate $70_3$ would be enabled and set the flip-flop $72_3$ thereby resetting the flip-flop 72. At the conclusion of the measuring period of the readout cycle, the set flip-flop of the flip-flops $72_1$–$72_3$ will be reset by a pulse from the sequence control on a line $S_8$.

For purposes of illustration, a particular hard-wired configuration is disclosed corresponding to the segment identifying counts representing the breakpoints $B_1$, $B_2$, and $B_3$. It will be appreciated, that these segment identifying counts and thus the proper hard-wire configuration are readily determined from the basic dual slope analog-to-digital converter equation $$N_2 = (V_{in})/(V_{ref}) \times N_1 \quad 1.$$

where
$V_{in}$ is the analog voltage input previously referred to,
$V_{ref}$ is the reference voltage previously referred to,
$N_1$ is a predetermined count such as a full-scale count in the register, and
$N_2$ is the output count.

Thus for a point on the segment 12 such as point $P_{12}$, the output representing the thermocouple input temperature, as a function of the input, the thermocouple output voltage, may be expressed as $$T_{out} = M_{12} V_{in} + C_{12}. \quad 2.$$

Similarly, for points $P_{13}$ and $P_{14}$ $$T_{out} = M_{13} V_{in} + C_{13} \quad 3.$$

$$T_{out} = M_{14} V_{in} + C_{14} \text{ respectively.} \quad 4.$$

The equation may be rewritten in the following form to reflect an analog-to-digital conversion characteristic of an ADC volt-count converter producing a count $N_{Tout}$ representing input temperature of the thermocouple in desired engineering units, degrees C. or F.:

$$N_{Tout} = (V_{in})/(V_{ref}) \times N_{12} + C_{12} \quad 5.$$

$$N_{Tout} = (V_{in})/(V_{ref}) \times N_{13} + C_{13} \quad 6.$$

$$N_{Tout} = (V_{in})/(V_{ref}) \times N_{14} + C_{14} \quad 7.$$

where
$V_{ref}$ = a reference voltage of the ADC converter
$N_{12}, N_{13}$, and $N_{14}$ = counts corresponding to the slopes of the linear segments 12, 13 and 14, and
$C_{12}, C_{13}$, and $C_{14}$ = counts corresponding to intercepts of the linear segments extended.

Assume now that the voltage-temperature function represented by the curve 11 is that of a Chromel-Alumel thermocouple with a reference junction at 0° F., the actual breakpoints $B_1$, $B_2$, $B_3$, and $B_4$ are as follows:

| Breakpoint | Temp. °F. | Input mv × 20 (gain of amplifier 36) |
|---|---|---|
| $B_1$ | 0 | 0 |
| $B_2$ | 400 | 179.8 |
| $B_3$ | 1200 | 553.2 |
| $B_4$ | 1600 | 737.6 |

By substituting the various breakpoint analog input voltages corresponding to the breakpoints $B_1$, $B_2$, and $B_3$ as identified above into Equation (7) as $V_{in}$, a voltage of 1,000 mv. as $v_{ref}$, and a full-scale count of 10,000 corresponding to a full register 22 as $N_1$, the various segment identifying counts may be determined as follows:

$$N_{B_1} = 0/1000 \times 10,000 = 0,$$

$$N_{B_2} = 179.8/1000 \times 10,000 = 1,798$$

$$N_{B_3} = 553.2/1000 \times 10,000 = 5,532.$$

Referring again to the decimal digit output of the decoder 66, it will be seen that the hard-wiring configuration associated with the AND gate $70_1$ is such that a decimal digit output or segment identifying count of the decoder 66 equal to the number 0001 will satisfy the AND gate $70_1$. Similarly, the hard-wiring configuration associated with the AND gates $70_2$ and $70_3$ are such that the segment identifying count from the decoder 66 of 1,798 and 5,532 will satisfy the AND gates $70_2$ and $70_3$ respectively. At the conclusion of the measuring period of the identification cycle, the breakpoint identifier 26 will have identified the lower breakpoint associated with the segment identified. In the case of point $P_{13}$, the lower breakpoint of the segment 13, the breakpoint $B_2$ will have been identified by the corresponding count 1,798 and the flip-flop $72_2$ associated therewith will have been set for an output to the count modifier identifier 28.

The circuitry of the count modifier identifier 28 for generating the slope and intercept count modifiers $\Phi_1$ and $\Phi_2$ includes a pair of selectors $74_1$ and $74_2$ and count modifier stored encoders $76_1$ and $76_2$ associated with each of the flip-flops $72_1$, $72_2$, and $72_3$. Only the selectors $74_1$ and $74_2$ and the encoders $76_1$ and $76_2$ associated with the flip-flop $72_2$ have been shown in detail.

The selectors $74_1$ and $74_2$ comprise four inverter gates $78_1$ and $78_2$ and four AND gates $80_1$ and $80_2$ which are enabled by pulses from the sequence control 24 on a line $S_9$ and $S_{10}$ respectively. The binary encoders $76_1$ and $76_2$ which are signal pattern generators comprising stored groups of inverters $82_1$ and stored groups of inverters $82_2$ generate binary encoded slope and intercept count modifiers $\Phi_1$ and $\Phi_2$ on the lines $62(a–d)$ in response to an output pulse from the selectors $74_1$ and $74_2$.

The value of the various count modifiers which are identified by the method of this invention and hard-wired at the inverters $82_1$ and $82_2$ may be determined by first solving Equation (4) as two simultaneous equations for the values of $N_{12}$ and $C_2$ and Equation (6) as two simultaneous equations for the values of $N_{14}$ and $C_{14}$. For example, the value of the constants $N_{13}$ and $C_{13}$ corresponding to the linear segment 13 and thus the point $P_{13}$ may be found by substituting the breakpoint value $B_2$ and $B_3$ as set forth in the foregoing breakpoint chart into Equation (4) and solving for the two unknowns $N_{13}$ and $C_{13}$ as follows:

$$400 = 179.8/1000 \times N_{13} + C_{13} \text{ and}$$

$$1200 = 553.2/1000 \times N_{13} + C_{13}$$

$$N_{13} = 2,142 \text{ and}$$

$$C_{13} = 0015.$$

Similarly, $$0 = 0/1000\, N_{12} + C_{12}$$

$$400 = 179.8/1000\, N_{12} + C_{12}$$

$$C_{12} = 0$$

$$N_{12} = 2230$$

and $$1200 = 553.2/1000\, N_{14} + C_{14}$$

$$1600 = 737.6/1000\, N_{14} + C_{14}$$

$$C_{14} = 0003$$

$$N_{14} = 2169$$

It will be recalled that the values of $N_{12}$, $N_{13}$, or $N_{14}$ must correspond to full-scale counts in the register 22. Consequently, the slope modifier $\Phi_1$ hard-wired at the inverters $82_1$ and $82_2$, must be such that the register 22 reaches the fullscale count after the accumulation of a total number of gate clock pulses equal to $N_{12}$, $N_{13}$, or $N_{14}$. Thus, for the point $P_{12}$, the full-scale complement of $N_{12}$, $10,000 - 2230 = 7770$, must be entered into the register 22 as the slope count modifier $\Phi_1$. Similarly, for the points $P_{13}$ and $P_{14}$, the slope count modifier $\Phi_1$ entered into the register 22 are 7858 and 7831.

When the values of $C_{12}$, $C_{13}$, or $C_{14}$ are positive, the actual values of $C_{12}$, $C_{13}$, or $C_{14}$ may be entered into the register. Thus the value 0, 0015, or 0003 for $C_{12}$, $C_{13}$, and $C_{14}$ will be identified and entered into the register 22 as the intercept count modifiers $\Phi_2$. However, where the values of $C_{12}$, $C_{13}$, or $C_{14}$ are negative, the full-scale complement must be entered into the register 22 as the intercept count modifiers $\Phi_2$ as in the case of $C_{14}$ in FIG. 2.

Reference will now be made to the timing diagram of FIG. 8 so as to more fully relate the sequential operation of the various circuits shown in FIGS. 7a and 7b. The timing diagram is divided into identification and readout cycles having measuring and sampling periods by vertically extending lines 100–105. Just prior to commencement of the sampling period of the identification cycle indicated by the vertically extending line 100, a pulse 106 sets the flip-flop 54 and clears the register 22. At the beginning of the sampling period of the identification cycle, the integrating capacitor 33 associated with the integrating amplifier 32 begins to be charged by the analog input voltage $V_{in}$ at a rate and voltage indicated by a line 107 and gated clock pulses 108 having exaggerated periods begin to enter the register 22. When a full-scale count is accumulated in the register 22 as indicated by the vertical line 101, the sampling period of the identification cycle will end. With a four digit decimal register having a count capacity of 10,000 and a free-running multivibrator 54 having a frequency of 100 kHz., the duration of the sampling period will be 100 milliseconds. At the instant the sampling period ends, the reference voltage $V_{ref}$ which is of opposite polarity to the analog input voltage $V_{in}$ begins to discharge the capacitor 33 represented by a line 109. Simultaneously, the gated clock pulses 108 continue to enter the register 22 and another count which is the identification count beings to accumulate and that count is continuously read out to the breakpoint identifier 26 at gates 60(a–d) which are enabled by a run-up latching pulse 110. When the capacitor 33 has been completely discharged, the measuring period of the segment identifying cycle will end in response to zero detection by the amplifier 56.

It will be noted that the duration of the measuring period and the count in the register 22 is directly related to $V_{in}$ since the total charge on the capacitor 33 at the end of the sampling period determines the length of time necessary to discharge the capacitor 33 by a constant voltage $V_{in}$. This is illustrated by a charging line 111 characteristic of a smaller value of $V_{in}$ and a discharge line 112 which indicates a constant rate of discharge down from a lesser voltage which results in a shorter measuring period. Once the identifying count in the register 22 has been received by the breakpoint identifier 26, the register may now be cleared by a register reset pulse 113 in preparation for the readout cycle.

In certain instances, hardware limitations may not permit the entry of the slope count modifier $\Phi_1$ during the sampling period of the readout cycle itself. In those instances, it is desirable to enter the slope count modifier $\Phi_1$ in the register 22 before the sampling period of the readout cycle begins. This may be accomplished by the slope count modifier enabling pulses 114 from the sequence control 24. At the beginning of the sampling period of the readout cycle indicated by the vertical line 103, the capacitor 33 will again begin to be charged by the voltage $V_{in}$ as indicated by line 115 and gated clock pulses 108 will enter the register 22. Although the capacitor 33 is charged until a full-scale count is reached in the register 17, it will be noted that the sampling period of the readout cycle is of a lesser duration than the sampling period of the identification cycle and hence the total charge on the capacitor 33 is less during the readout cycle than it is during the identification cycle. This is true since the full-scale count is reached in a shorter period of time due to the entry of the slope count modifier into the register 22 by the pulse 114. At the instant the sampling period of the readout cycle terminates and the measuring period of the readout cycle begins, an enabling pulse 116 is sent from the sequence control 24 on line $S_{10}$ to enter the intercept count modifier $\Phi_2$ in the register 22. Simultaneously, the negative voltage of the reference voltage $V_{ref}$ is applied at the ADC 20 to discharge the capacitor 33 as illustrated by a line 117. When a zero charge on the capacitor 33 is detected by the amplifier 56, the measuring period of the readout cycle ends as indicated by a line 105 with the accumulated count in the register 22 indicating the actual temperature corresponding to the particular analog input voltage $V_{in}$. Thus for an instantaneous value of an analog input voltage $V_{in}$ corresponding to the point $P_{13}$, the actual accumulated count in the register 22 will equal the temperature in desired engineering units defined by the point $P_{13}$. This count is then read out to the numerical display 49 by an enabling pulse 118 and the breakpoint identifier 26 is reset by a pulse 119.

For the sake of simplicity, only four breakpoints have been shown on the curve 11. However, many more breakpoints may be utilized to more closely approximate the function. Furthermore, by the method of digital identification and digital modification disclosed in the foregoing, additional breakpoints are readily accommodated.

It will be appreciated that the previously described system may be utilized to read out something other than temperature. For example, it might be desirable to read out the square root of temperature. This may be accomplished by merely identifying count modifiers to correspond to segments of a new function, the voltage-square root of temperature function rather than the voltage temperature function. Of course, the new function would have different breakpoints as well as count modifiers so it would be necessary to reprogram the breakpoint identifier 26 as well as the count modifier identifier 28. It will also be appreciated that a digital transducer might be utilized so as to produce a digital input rather than an analog input to be linearized. Such a system is disclosed in application Ser. No. 889,506 filed Dec. 31, 1969, and assigned to the assignee of this invention.

A system for performing the Incremental Slope Method in the manufacture of the system 304 comprising a Numatron numeric display system will now be described with reference to FIG. 4. Initially, the data file for a particular sensor or transducer including the points on the nonlinear curve is stored in a programmed general purpose computer 350 by means of a typewriter input keyboard 352 such as that desclosed in U.S. Pat. No. 3,238,505. The computer 350 may comprise a computer accessed by the IBM terminal 2741. In the alternative, the computer 350 may comprise a Control Data Corporation machine having the general model designation 6600. The output from the computer 350 may be in the form of a punch tape 354 which is utilized to control an automatic wiring machine 356. The machine 356 which is capable of an x-y motion may comprise the automatic TERMIPOINT machine, Model IIIB manufactured by AMP, Incorporated. The automatic wiring machine 356 is utilized to wire logic crads 358 for a Numatron display device 360. The various wiring connection 362 are shown on the card 358.

Figure 10:
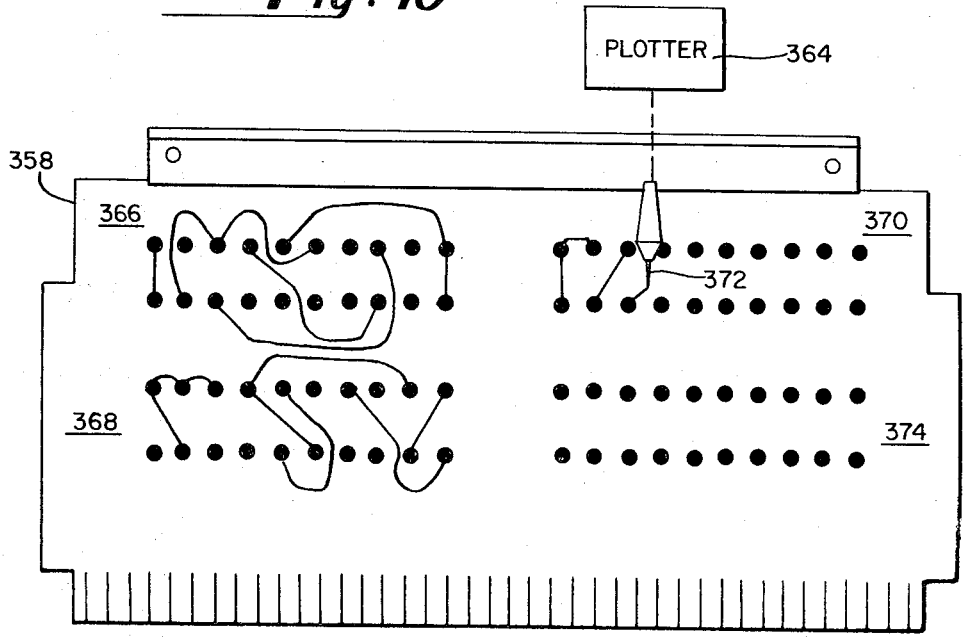
FIG. 10 is a schematic diagram also utilizing the invention in the manufacture of the system disclosed in the block diagram of FIG. 6 and the circuit diagrams of FIGS. 7a and 7b.

In FIG. 10, a somewhat different means is shown for identifying the various circuit connections of a NUMATRON logic card 358. Rather than utilize the wiring machine 356 to identify the connections on the card 358, a plotter 364 is utilized. (A variety of types of planar plotting machines have been devised that can be employed for use in the practice of this invention. For example, various pen types such as the Boeing Plotter (The Boeing Company), the Moseley Plotter (575 Model), the Benson-Lehner (Model J) and the Electronic Associates Plotter can be used. Cathode Ray types can also be employed, such as the planar plotters of Stromberg-Carlson (General Dynamics) and of International Business Machines (Model 740). Electrosensitive types can also be used, such as the Lockheed Hogan System and the Tally Model 503 (Tally Register Company). Of course, such a plotter would be controlled by the output from the computer 350. As shown, a first group of terminals 366 and 368 have been connected by a plot or mark for a wiring connection. A third group of terminals 370 are in the process of having the appropriate connections identified or marked by a stylus 372 of the plotter 364. The connections for the last set of terminals 374 have not yet been identified or marked.

It will of course be appreciated that appropriate connections may be identified by a numerical readout from the computer 350 in a suitable form such as a printer readout. Such a printout could provide the necessary slope and intercept information with respect to the approximating line segments.

Many modifications of the foregoing program will be apparent to persons of ordinary skill in this art. For instance, the method used in the foregoing example need not be limited to a monotonic curve. Appended claims are intended to cover any such modifications within the true spirit and scope of the invention.

What is claimed is:

1. In the manufacture of a system for generating a dependent output variable which is a nonlinear function of an independent input variable, said function capable of approximation by a plurality of linear segments joining breakpoints near the curve representing said nonlinear function, each of the linear segments having characteristic slopes and intercepts, the method comprising the following step:

1. storing the values of variables corresponding to a plurality of points on said curve representing said nonlinear function in a programmed, automatic computing apparatus;

the method also comprising the following programmed steps executed by said computing apparatus:

2. determining the difference between the value of one of the function variables on said curve and the approximated value of said one variable on a straight line segment having a particular slope and intercept for a particular value of the other of the function variables;

3. incrementing said other variable and repeating step 2 so long as the difference obtained from step 2 lies within a predetermined range of deviation thereby incrementing the length of the straight line segment;

4. incrementing the slope of the straight line segment when the difference of step 2 exceeds a predetermined range of deviation;

5. storing the length of the straight line segment before the slope is incremented;

6. determining the slope and intercept characteristic of the straight line segment having the longest length;

the method further comprising the step of 7. identifying a circuit connection for said system corresponding to the straight line segment having the longest length.

2. The method of claim 1 wherein one end of said line segment pivots about the breakpoint while the slope of the straight line segment is incremented and the value of said other variable is incremented.

3. The method of claim 2 wherein steps 1–7 are repeated using the other end of said straight line segment having the longest length as the next breakpoint until all of said plurality of segments are determined.

4. The method of claim 3 wherein the incrementing of the slope in step 4 continues until the length of the straight line segment characterized by the incremented slope begins to decrease.

5. The method of claim 4 wherein the increment of the slope characteristic of the straight line segment having the longest length is determined in step 6 by counting the number of incremented values of said other variable for each straight line segment characterized by a particular slope increment.

6. The method of claim 5 including the step of computing each straight line segment terminating at each breakpoint for each characteristic increment of slope.

7. The method of claim 4 wherein the incrementing of the slope in step 4 comprises the steps of incrementing the slope with coarser or larger increments initially so as to roughly determine the characteristic slope of the straight line segment having the longest length and incrementing the slope with finer or smaller increments subsequently in the vicinity of the roughly determined characteristic slope to more precisely determine the characteristic slope of the straight line segment having the longest length.

8. The method of claim 7 wherein the slope is increased and decreased by incrementing with the finer or smaller increment in the vicinity of the roughly determined characteristic slope of the line segment.

9. The method of claim 8 wherein the slope is incremented utilizing increments having at least three degrees of coarseness, said slope being incremented with a finer increment on both sides of a coarser increment to determine the appropriate direction of incrementation to locate the straight line segment having the longest length.

10. The method of claim 4 wherein the identification of the circuit connection of step 7 comprises the marking of the connection in said system.

11. The method of claim 4 wherein the identification of the circuit connection in step 7 comprises the wiring of the circuit connection in said system.

12. In the manufacture of a system including a analog-to-digital converter for generating a linearized digital output as a dependent variable which is a nonlinear function of an input as an independent variable, said function being approximated by a plurality of continuous linear segments joining breakpoints on or near a curve plotted with respect to a pair of Cartesian coordinate axes and representing said nonlinear function, the method including the following steps each executed by a programmed, automatic computing apparatus:
1. determining the difference between the value of the dependent variable on said curve and the approximated value of the dependent variable on one set of straight line segments having different slopes with one end terminating at an initial breakpoint near said curve, said difference being determined for different values of the independent variable;
2. determining the maximum length for one straight line segment in said set such that said difference does not exceed a predetermined range of deviation and the other end terminates off the curve;
3. repeating the foregoing steps utilizing the other end of said one straight line segment as another breakpoint; and
4. determining slopes and intercepts on the dependent variable coordinate axis for each determined straight line segment joining breakpoints on or near said curve.

13. The method of claim 12 further including the step of identifying circuit connections for said system in response to and corresponding to said determined slopes and intercepts.

14. The method of approximating a nonlinear function by a plurality of straight line segments joining breakpoints near a curve representing said nonlinear function, the method comprising the following programmed steps executed by a programmed computing apparatus:
1. determining the difference between the value of one of the function variables on said curve and the approximated value of said one variable on a straight line segment having a particular slope for a particular value of the other of the function variable;
2. incrementing said other variable and repeating step 1 so long as the difference obtained from step 1 lies within a predetermined range of deviation thereby incrementing the length of the straight line segment;
3. incrementing the slope of the straight line segment when the difference of step 1 exceeds a predetermined range of deviation;
4. storing the length of the straight line segment before the slope is incremented; and
5. determining the increment of slope and intercept characteristic of the straight line segment having the longest length.

15. The method of claim 14 wherein one end of said line segment pivots about the breakpoint while the slope of the straight line segment is incremented and the value of said other variable is incremented.

16. The method of claim 15 wherein steps 1-7 are repeated using the other end of said straight line segment having the longest length as the next breakpoint until all of said plurality of segments are determined.

17. The method of claim 16 wherein the slope is incremented in a direction so as to increase or decrease in a direction determined by the sign of said difference at the breakpoint of the previous straight line segment.

18. A method of establishing a linearized digital output from a dual slope analog-to-digital converter approximating a nonlinear function characterized by a curve having an independent variable plotted along one Cartesian coordinate axis and a dependent variable plotted along the other coordinate axis, the method comprising the operation of an automatic programmed computing system in the performance of the following programmed steps:
1. determining a straight line segment approximating the curve extending from one originating breakpoint near said curve with the maximum deviation therefrom not exceeding a predetermined limit;
2. repeatedly applying a scanning function with respect to said straight line segment to identify a plurality of straight line segments having different lengths and extending from said breakpoint in different angular directions with respect to said one terminal breakpoint;
3. identifying the one of said straight line segments representing a line having the maximum length, originating at said breakpoint, and terminating at its opposite end at another breakpoint near said curve, the deviation of said straight line throughout its length from said curve not exceeding said predetermined limit, repeating the foregoing steps utilizing each last-named breakpoint for scanning until there has been identified that plurality of straight line segments coextensive with and approximating said curve and none of which throughout the respective lengths thereof deviates from said curve beyond said predetermined limit; determining the slopes and intercepts of each of said straight lines approximating said curve; and applying said slopes and intercepts to a system for generation of said linearized digital output for said dual slope analog-to-digital converter.

* * * * *